(12) United States Patent
Hamilton et al.

(10) Patent No.: US 10,268,826 B2
(45) Date of Patent: *Apr. 23, 2019

(54) PRIVACY-BASED DEGRADATION OF ACTIVITY SIGNALS AND AUTOMATIC ACTIVATION OF PRIVACY MODES

(71) Applicant: Microsoft Technology Licensing, LLC, Redmond, WA (US)

(72) Inventors: Colleen Hamilton, Kirkland, WA (US); Robert Howard, Bellevue, WA (US); Lee Dicks Clark, Seattle, WA (US); John Yovin, Woodinville, WA (US); Shawn Brown, Sammamish, WA (US); Sogol Malekzadeh, Sammamish, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/896,813

(22) Filed: Feb. 14, 2018

(65) Prior Publication Data

US 2018/0173882 A1 Jun. 21, 2018

Related U.S. Application Data

(63) Continuation of application No. 14/156,390, filed on Jan. 15, 2014, now Pat. No. 9,922,197.

(51) Int. Cl.
*G06F 21/50* (2013.01)
*G06F 21/60* (2013.01)
(Continued)

(52) U.S. Cl.
CPC .............. *G06F 21/60* (2013.01); *G06F 21/50* (2013.01); *G06F 21/6245* (2013.01);
(Continued)

(58) Field of Classification Search
CPC ....................................................... G06F 21/60
See application file for complete search history.

(56) References Cited

U.S. PATENT DOCUMENTS 6,701,362 B1 * 3/2004 Subramonian .......... H04L 29/06
709/224
8,504,481 B2 8/2013 Motahari et al.
(Continued)

FOREIGN PATENT DOCUMENTS

CN 101513027 A 8/2009
JP 2006352561 A 12/2006
(Continued)

OTHER PUBLICATIONS

"Non Final Office Action Issued in U.S. Appl. No. 14/156,390", dated Apr. 21, 2017, 16 Pages.
(Continued)

*Primary Examiner* — Kambiz Zand
*Assistant Examiner* — Thanh H Le
(74) *Attorney, Agent, or Firm* — Fiala & Weaver P.L.L.C.

(57) ABSTRACT

Methods, systems, and computer program products are provided that address issues related to data privacy by enabling users to elect various levels of data sharing. A user of a user device is enabled to indicate their comfort level with sharing, transmitting, or otherwise exposing individual activity records (data entities) with respect to various activity categories. The exposure of activity records may be controlled with respect to on-device and off-device components. Furthermore, privacy profiles may be automatically generated for the user, and the privacy profiles may be automatically activated in corresponding situations.

20 Claims, 12 Drawing Sheets

(51) Int. Cl.
*H04L 29/06* (2006.01)
*G06F 21/62* (2013.01)
*H04W 12/02* (2009.01)

(52) U.S. Cl.
CPC ............. *H04L 63/10* (2013.01); *H04W 12/02* (2013.01); *G06F 2221/2101* (2013.01); *G06F 2221/2111* (2013.01)

(56) References Cited

U.S. PATENT DOCUMENTS

| | | | |
|---|---|---|---|
| 8,566,956 | B2 | 10/2013 | Slater |
| 8,769,044 | B2 | 7/2014 | Carlander |
| 2007/0130336 | A1 | 6/2007 | Hietala et al. |
| 2007/0130473 | A1 | 6/2007 | Mazotas |
| 2007/0281689 | A1 | 12/2007 | Altman et al. |
| 2008/0051081 | A1 | 2/2008 | Nelson |
| 2011/0145908 | A1 | 6/2011 | Ting |
| 2011/0178837 | A1* | 7/2011 | Goerges ............... G06Q 10/06 705/7.28 |
| 2011/0179496 | A1 | 7/2011 | Oono |
| 2012/0122566 | A1* | 5/2012 | Bhogal ............... G08B 21/02 463/29 |
| 2012/0222083 | A1 | 8/2012 | Vaha-sipila et al. |
| 2012/0239173 | A1 | 9/2012 | Laikari et al. |
| 2012/0278830 | A1 | 11/2012 | Khoshgozaran et al. |
| 2013/0006904 | A1 | 1/2013 | Horvitz et al. |
| 2013/0232552 | A1* | 9/2013 | Brush ............... G06F 21/6263 726/4 |

FOREIGN PATENT DOCUMENTS

| | | | |
|---|---|---|---|
| JP | 2008234129 | A | 10/2008 |
| JP | 2009146193 | A | 7/2009 |
| JP | 2009254086 | A | 10/2009 |
| JP | 2010117874 | A | 5/2010 |
| RU | 2060540 | C1 | 5/1996 |
| RU | 129279 | U1 | 6/2013 |

OTHER PUBLICATIONS

"Notice of Allowance Issued in U.S. Appl. No. 14/156,390", dated Nov. 7, 2017, 8 Pages.
"Final Office Action Issued in U.S. Appl. No. 14/156,390", dated Jun. 27, 2016, 16 Pages.
"Final Office Action Issued in U.S. Appl. No. 14/156,390", dated Sep. 22, 2015, 14 Pages.
"Non Final Office Action Issued in U.S. Appl. No. 14/156,390", dated Jan. 4, 2016, 15 Pages.
"Non Final Office Action Issued in U.S. Appl. No. 14/156,390", dated May 21, 2015, 13 Pages.
"Office Action Issued in European Patent Application No. 15701621.3", dated Sep. 13, 2017, 9 Pages.
"First Office Action and Search Report Issued in Chinese Patent Application No. 201580004752.8", dated Mar. 22, 2018, 14 Pages.
Amadeo, Ron, "App Ops: Android 4.3's Hidden App Permission Manager, Control Permissions for Individual Apps! [Update]", Retrieved from <<http://www.androidpolice.com/2013/07/25/app-ops-android-4-3s-hidden-app-permission-manager-control-permissions-for-individual-apps/>>, Jul. 25, 2013, 5 Pages.
Hong, et al., "Dynamic Privacy Management: a Plug-in Service for the Middleware in Pervasive Computing", In Proceedings of the 7th International Conference on Human Computer Interaction with Mobile Devices & Services, Sep. 19, 2005, 8 Pages.
Lamian, "LBE Privacy Guard", Retrieved from <<http://web.archive.org/web/20121109132526/https://play.google.com/store/apps/details?id=com.lbe.security.lite>>, Mar. 6, 2012, 2 Pages.
"Office Action Issued in Mexican Patent Application No. MX/a/2016/009176", dated Oct. 24, 2017, 5 Pages.
"International Preliminary Report on Patentability Issued in PCT Application No. PCT/US2015/010712", dated Mar. 30, 2016, 10 Pages.
"International Search Report and Written Opinion Issued in PCT Patent Application No. PCT/US2015/010712", dated Mar. 20, 2015, 12 Pages.
"Second Written Opinion Issued in PCT Application No. PCT/US2015/010712", dated Nov. 25, 2015, 9 Pages.
Russello, et al., "YAASE: Yet Another Android Security Extension", In Proceedings of IEEE Third International Conference on Privacy, Security, Risk and Trust (PASSAT) and Social Computing (SocialCom), Oct. 9, 2011, pp. 1033-1040.
Stephen (Stericson), "Permissions Denied", Retrieved from <<http://web.archive.org/web/20161001193856/https://play.google.com/store/apps/details?id=com.stericson.permissions.donate&hl=en>>, Jun. 18, 2013, 2 Pages.
Troutman, Conan, "Manage Individual App Permissions with XPrivacy", Retrieved from <<https://www.xda-developers.com/android/manage-individual-app-permissions-with-xprivacy/>>, Jun. 20, 2013, 2 Pages.
"Office Action Issued in Russian Patent Application No. 2016128757", dated Aug. 15, 2018, 10 Pages.
"Second Office Action Issued in Chinese Patent Application No. 201580004752.8", dated Nov. 13, 2018, 12 Pages.
"Office Action Issued in Japanese Patent Application No. 2016-547093", dated Oct. 24, 2018, 8 Pages.

* cited by examiner

902 determine whether the data entity passes one or more user filters configured for the requested activity type

1002 determine that the target disclosure audience specified in the request falls outside of the access limit for the activity type

1004 enable access by the requestor to data entities that fall under the access limit for the activity type but not to data entities that fall outside of the access limit for the activity type

FIG. 10

PRIVACY-BASED DEGRADATION OF ACTIVITY SIGNALS AND AUTOMATIC ACTIVATION OF PRIVACY MODES

CROSS-REFERENCE TO RELATED APPLICATIONS

This application is a continuation of U.S. application Ser. No. 14/156,390, filed Jan. 15, 2014, entitled "Privacy-Based Degradation of Activity Signals and Automatic Activation of Privacy Modes," now allowed, which is incorporated by reference in its entirety herein.

BACKGROUND

Privacy and security have become a high priority for both consumers and companies that use computing devices that contain personal or highly confidential information/data. While many users are excited about the possibilities opened up by sharing detailed data records of their activity with a system capable of reasoning over these records, many other users are concerned about the a perceived invasion of privacy which they must "put up with" in order to have enhanced experiences. Some users decide to opt-out of the sharing of their data altogether, forgoing the enhanced experiences in favor of retaining their privacy.

Furthermore, in different situations, different restrictions on activity records may be desired. However, current techniques tend to provide for an all-or-nothing way to lock down activity records in given situations, and the user has to manually switch between these modes. An example of this is the manual launching of an Internet browser in a private mode or in a non-private mode.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided that address issues related to data privacy by enabling users to elect from various levels of data sharing, including privacy levels between full private and full public modes. A user of a user device is enabled to indicate their comfort level with sharing, transmitting, or otherwise exposing individual activity records with respect to various activity types/categories. The exposure of activity records may be controlled with respect to on-device and off-device components. Furthermore, privacy profiles may be automatically generated for the user, and the privacy profiles may be automatically activated in corresponding situations. Data sharing may be adapted based on various factors, such physical activities, location, or interactions with a user-defined class of individuals.

In one implementation, a method in a user device is provided for defining data sharing for an activity type. A nomination of an activity type is received. A selection of an access limit is enabled for access to data entities of the activity type from a pre-defined plurality of access limits. An activity monitor is configured to provide access to data entities of the activity type according to the selected access limit. Furthermore, the access limit may be configured with a filter that filters a subset of data entities associated with the activity type.

In another implementation, another method in a user device is provided for handling activity record exposure requests. A request is received for an activity type from a requestor. The request specifies a target disclosure audience. An access limit for the activity type is checked. The activity type request is allowed when the target disclosure audience is within the access limit. The activity type may be rejected if the target disclosure audience specified in the request falls outside of the access limit for the activity type.

An occurrence of a data entity of the requested activity type (due to user activity) may be detected. The requestor is enabled to access the data entity. It may be optionally determined whether the data entity passes one or more user filters configured for the requested activity type, before enabling the requestor to access the data entity.

In still another implementation, a method in a user device is provided for inferring privacy profiles. Activity records corresponding to received data entities are collected. The activity records are analyzed for correlation. A privacy profile and an associated situation are inferred based on the analysis. The privacy profile is proposed to a user with an indication of the associated situation. The user is enabled to approve, reject, or modify at the proposed privacy profile and associated situation. The proposed privacy profile and associated situation are included in a set of privacy profiles for the user when the user approves the proposed privacy profile.

Further activity records corresponding to further received data entities may be collected. The further activity records may be analyzed. A situation trigger may be inferred based on the analysis of the collected further activity records. A privacy profile having an associated situation indicated by the inferred situation trigger may be selected from the set of privacy profiles. The selected privacy profile may be enacted for the user. Additional activity records may be collected according to the enacted privacy profile.

A computer readable storage medium is also disclosed herein having computer program instructions stored therein that enables an access limit for an activity type to be configured, enables activity type requests to be handled, enables data entities to be provided according to the configured access limits, and enables privacy profiles to be automatically generated and enacted, according to the embodiments described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 9 shows a process in a user device for filtering a received data entity, according to an example embodiment.

FIG. 10 shows a flowchart providing a process in a user device to handle an activity record exposure request having a target disclosure audience that falls outside of an access limit for the activity type, according to an example embodiment.

Figure 1:
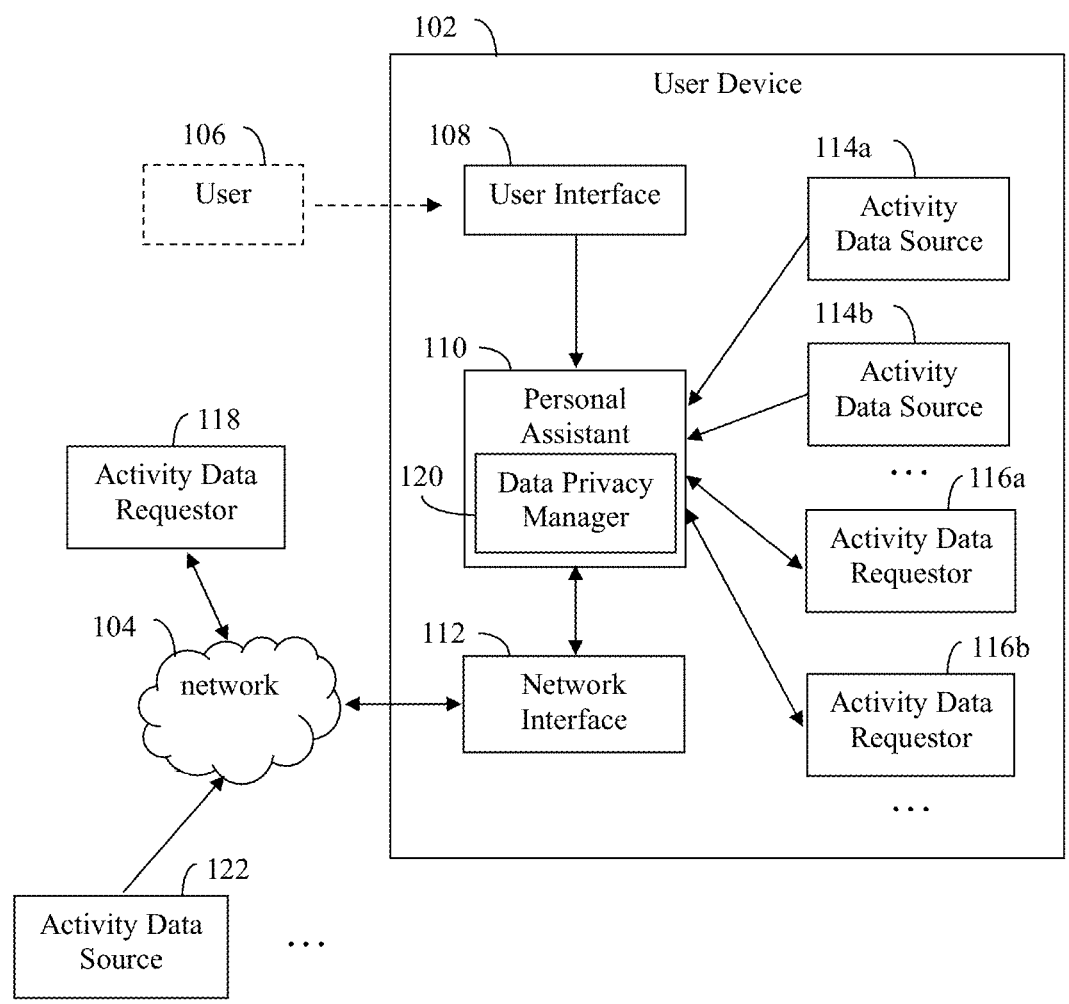
FIG. 1 shows a block diagram of a system in which an electronic personal assistant manages the privacy of data shared between activity data sources and requestors according to various data sharing privacy levels configured for a user, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Embodiments described herein enable multiple privacy profiles providing various levels of coarse- to fine-grain lockdown on privacy related to the sharing of a user's data. Embodiments enable specific types of data records to be used by user-specified entities, and enable automatic switching into and out of various exposure profiles based upon attributes, such as physical activities of the user, location, or interactions with a user-defined class of individuals.

For instance, FIG. 1 shows a block diagram of a system 100, according to an example embodiment. In system 100, a user device 102 includes an electronic personal assistant 110 that manages the privacy of data shared between activity data sources and data requestors. As shown in FIG. 1, user device 102 includes a user interface 108, electronic personal assistant 110, a network interface 112, a first activity data source 114a, a second activity data source 114b, a first activity data requestor 116a, and a second activity data requestor 116b. A user 106 interacts with user interface 108 of user device 102. Network interface 112 enables communications by user device 102 with remote entities over a network 104, such as a third activity data requestor 118 and a third activity data source 122. Electronic personal assistant 110 includes a data privacy manager 120. System 100 is described in further detail as follows.

User device 102 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), a wearable computing device (e.g., a smart watch, a head-mounted device including smart glasses such as Google® Glass™, etc.), or other type of mobile device (e.g., an automobile), or a stationary computing device such as a desktop computer or PC (personal computer). Still further, user device 102 may be a portable media player, a stationary or handheld gaming console, a personal navigation assistant, a camera, or other type of stationary or mobile device.

Network interface 112 of user device 102 enables user device 102 to communicate over network 104. Examples of network 104 include a local area network (LAN), a wide area network (WAN), a personal area network (PAN), and/or a combination of communication networks, such as the Internet. Network interface 112 may include one or more of any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc.

User interface 108 of user device 102 enables a user, such as user 106, to interact with user device 102 to perform functions. User interface 108 may include one or more physical user interface (UI) elements and/or may include a graphical user interface (GUI) that includes one or more displayed/virtual UI elements and/or may include an audible user interface that includes one or more spoken and/or audible UI elements. User interface 108 may enable the user to interact in various ways, such as by typing on a virtual or physical keypad, by speaking (e.g., speech recognition), by one or more gestures, and/or by other user interface input mechanism described elsewhere herein or otherwise known.

Electronic personal assistant 110 is an application (e.g., one or more computer programs that execute in processor(s) of user device 102) that a user, such as user 106, can interact with through user interface 108. Electronic personal assistant 110 is configured to provide general assistance to a user by handling requests provided by the user, such as requests to perform tasks and/or services. For instance, in embodiments, electronic personal assistant 110 may be configured to answer questions, make recommendations, and/or perform actions. Electronic personal assistant 110 may be fully contained in user device 102, or may further include a network/cloud-based back end to handle requests and/or to delegate requests to a set of web services.

For instance, electronic personal assistant 110 may handle the requests based on user input as well as based on features such as location awareness and the ability to access information from a variety of sources including online sources (such as weather or traffic conditions, news, stock prices, user schedules, retail prices, etc.). Examples of tasks that may be performed by electronic personal assistant 110 on behalf of a user may include, but are not limited to, placing a phone call to a user-specified person, launching a user-specified application, sending a user-specified e-mail or text message to a user-specified recipient, playing user-specified music, scheduling a meeting or other event on a user calendar, obtaining directions to a user-specified location, obtaining a score associated with a user-specified sporting event, posting user-specified content to a social media web site or microblogging service, recording user-specified reminders or notes, obtaining a weather report, obtaining the current time, setting an alarm at a user-specified time, obtaining a stock price for a user-specified company, finding a nearby commercial establishment, performing an Internet search, or the like. Electronic personal assistant 110 may use any of a variety of artificial intelligence techniques to improve its performance over time through continued interaction with the user. Electronic personal assistant 110 may also be referred to as a digital personal assistant, an intelligent personal assistant, an intelligent software assistant, a virtual personal assistant, or the like.

User interface 106 enables a user to submit questions, commands, or other verbal input and delivers responses to such input to the user. In one embodiment, the input may comprise user speech that is captured by one or more microphones of user device 102, although this example is not intended to be limiting and user input may be provided in other ways as well. The responses generated by electronic personal assistant 110 may be made visible to the user in the form of text, images, or other visual content shown by user interface 106 on a display of user device 102 (e.g., within a graphical user interface). The responses may also comprise computer-generated speech or other audio content that is played back via one or more speakers of user device 102.

Data privacy manager 120, shown included in electronic personal assistant 110 in the embodiment of FIG. 1, is configured to enable electronic personal assistant 110 to manage the privacy of data exchange between activity data sources, such as activity data sources 114*a*, 114*b*, and 122 and activity data requestors, such as activity data requestors 116*a*, 116*b*, and 118, as well as the privacy of data from activity sources with respect to electronic personal assistant 110 itself. Activity data sources 114*a* and 114*b* are each any form of component, process, application (e.g., mobile application or "App," desktop application, etc.), combinations thereof, etc. that operates on user device 102 and that generates activity data related to user activities. An instance of such generated activity data is referred to herein as a "data entity," which may have any form (e.g., a data packet, a file, a database entry, a data record, etc.). A data entity is a data record of an activity associated with the user, such as a change of location of the user (e.g., a new location, a direction, a speed, etc.), a message received/sent by the user, an appointment of the user, a task reminder/alert for the user, an updating of profile information by the user, metadata associated with a media object (e.g., a time/date, location of capture, recording length, etc.), other activity mentioned elsewhere herein, etc. Activity data source 122 is any form of component, process, application, website, web service, combinations thereof, etc., which operates external to user device 102 on one or more devices (e.g., servers, other user devices, etc.) that may generate activity data related to user activities, and provide such generated activity data to user device 102 over network 104. Note that in some cases, an activity data source may include a first component located in user device 102 (e.g., an "app") and a second component that is remote from user device 102 (e.g., a backend server for the "app").

Examples of activity data sources 114*a*, 114*b*, and 122 include a location determining application that determines location data regarding the user (e.g., a global positioning system (GPS) application, a mapping tool, etc.), a messaging application that receives/transmits messages for the user (e.g., an email application, a text messaging application, etc.), a calendar application that manages appointments regarding the user, a social networking application that generates and/or relays social networking data such as posts, messages, tweets, etc. associated with the user (e.g., Facebook® operated by Facebook, Inc. of Palo Alto, Calif., Google+ operated by Google, Inc. of Mountain View, Calif., Twitter® operated by Twitter, Inc. of San Francisco, Calif., etc.), a game application that generates game related data associated with the user, a media application that captures/receives a media object having metadata (e.g., an image, a video, an audio recording, etc.), etc. Further examples of activity data source 120 include third party partner solution data exchange, such as Facebook® Checkins, etc. User device 102 may contain and/or communicate with any number of activity data sources, including numbers of activity data sources in the tens, hundreds, thousands, etc., that generate data entities. Such activity data sources may provide any quantity and type of activity data associated with the user. User device 102 may contain any number of activity data sources, and any number of remote (off-device, network/cloud-based) activity data sources may be present.

Activity data requestors 116a, 116b, and 118 may each be any form of component, process, application, etc., that desires/uses activity data associated with the user, and therefore requests data entities associated with the user. Activity data requestors 116a, 116b, and 118 may each be any form of application mentioned elsewhere herein (e.g., a location determining, a messaging application, a calendar application, a social networking application, a game application, a media application, etc.), as well as any further type of application that may desire user data. Further examples of activity data requestors 116a, 116b, and 118 may include news applications that desire user data to tailor news to the user, recommendation applications that desire user data to tailor recommendations to the user (e.g., restaurant recommendations based on location, food preferences, etc.; trip recommendations based on location, travel preferences, etc.), etc. User device 102 may contain any number of activity data requestors, and any number of remote (off-device) activity data requestors may be present (as well as activity data requestors that have both user device-based and remote, back-end components). Note that electronic personal assistant 110 may be considered an activity data requestor itself.

Data privacy manager 120 is configured to enable electronic personal assistant 110 to manage the privacy of data exchange between activity data sources and activity data requestors. Note that although data privacy manager 120 is shown located in electronic personal assistant 110 in FIG. 1, in other embodiments, privacy manager 120 may be separate from electronic personal assistant 110.

Data privacy manager 120 enables highly usable and fine-grained user control for the user to indicate their comfort level with sharing, transmitting, or otherwise exposing individual activity records, and general activity categories, which the reasoning system of electronic personal assistant 110 may consume. This exposure can be to the internal reasoning component of electronic personal assistant 110, to external reasoning components (e.g., to a network-based back-end of electronic personal assistant 110), to second and/or third party systems, to other users and/or their devices, etc., thereby creating boundaries of trust, within which particular activities are or are not allowed.

Data privacy manager 120 addresses the access restrictions in various ways, such as by locking down the activity data requestors that consume particular activity data, or even by preventing a particular type of activity data from being collected in the first place. Thus, data privacy manager 120 provides flexibility beyond merely turning on or off access to particular signal types, such as location signals.

Data privacy manager 120 further enables the configuration of different exposure profiles. Such exposure profiles enable the user to compartmentalize their life (e.g., work life exposure, home life exposure, etc.) by controlling who/what can access or request information within each profile.

Furthermore, data privacy manager 120 provides for automatic detection of situations that indicate use of a particular exposure profile, and the adoption/configuration of the appropriate exposure profile to be enacted while the user remains in that situation. For example, one situation may be when the user is at work (e.g., by location, time of day, day of week, etc.). Data privacy manager 120 may detect such a situation, and in response may trigger a predefined work life exposure profile. When data privacy manager 120 detects the situation where the user is not at work, a home life exposure profile may be triggered.

Still further, data privacy manager 120 enables users to wipe out previously recorded activity which they do not want included in the system, either by activity category, or by identifying activity records related to specific criteria.

Figure 2:
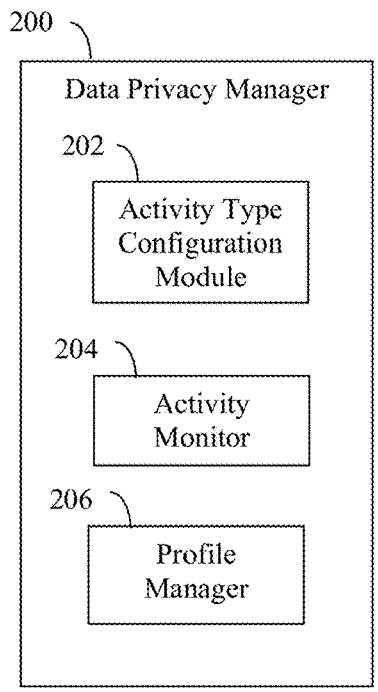
FIG. 2 shows a block diagram of a data privacy manager configured to manage data sharing privacy, according to an example embodiment.

Data privacy manager 120 may be configured in various ways to enable these functions. For instance, FIG. 2 shows a block diagram of a data privacy manager 200 configured to manage data sharing privacy, according to an example embodiment. Data privacy manager 200 of FIG. 2 is an example embodiment of data privacy manager 120 of FIG. 1. As shown in FIG. 2, data privacy manager 200 includes an activity type configuration module 202, an activity monitor 204, and a profile manager 206.

Activity type configuration module 202 is configured to enable a user to define access limits for particular types of user activity. Activity monitor 204 is configured to handle activity record exposure requests from activity data requestors, and to provide data entities to requestors according to configured access limits. Profile manager 206 is configured to automatically generate exposure profiles, and detect situations where exposure profile are automatically enacted.

Further details regarding embodiments, including further detail regarding activity type configuration module 202, activity monitor 204, and profile manager 206, are described in the following sections. For instance, Section II, which follows this section, describes exemplary methods and systems for defining access limits for activity types. Section III describes exemplary methods and systems for handling activity record exposure requests and for sharing data entities according to configured access limits. Section IV describes exemplary methods and systems for automatically generating and enacting exposure profiles. Section V describes exemplary mobile and desktop computing devices that may be used to implement data privacy management in accordance with embodiments described herein. Section VI provides some concluding remarks.

II. Example Embodiments for Defining Access Limits for Activity Types

Figure 3:
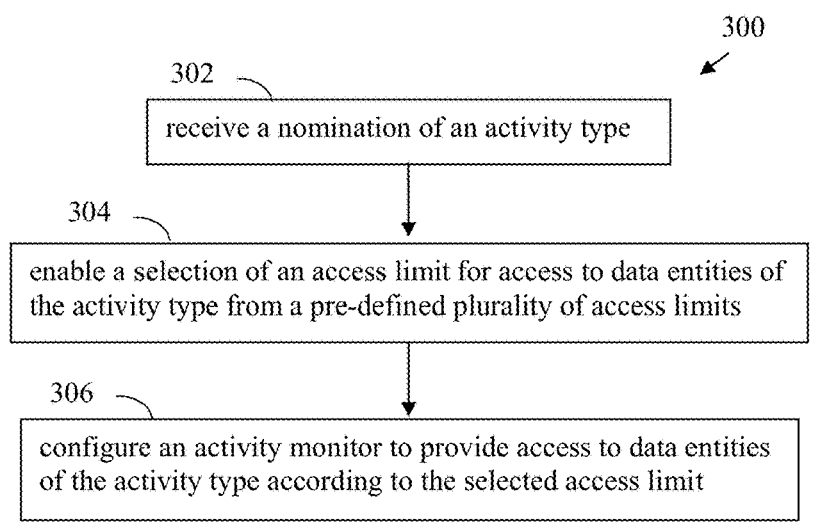
FIG. 3 shows a flowchart providing a process in a user device to configure data sharing for an activity type, according to an example embodiment.
Figure 4:
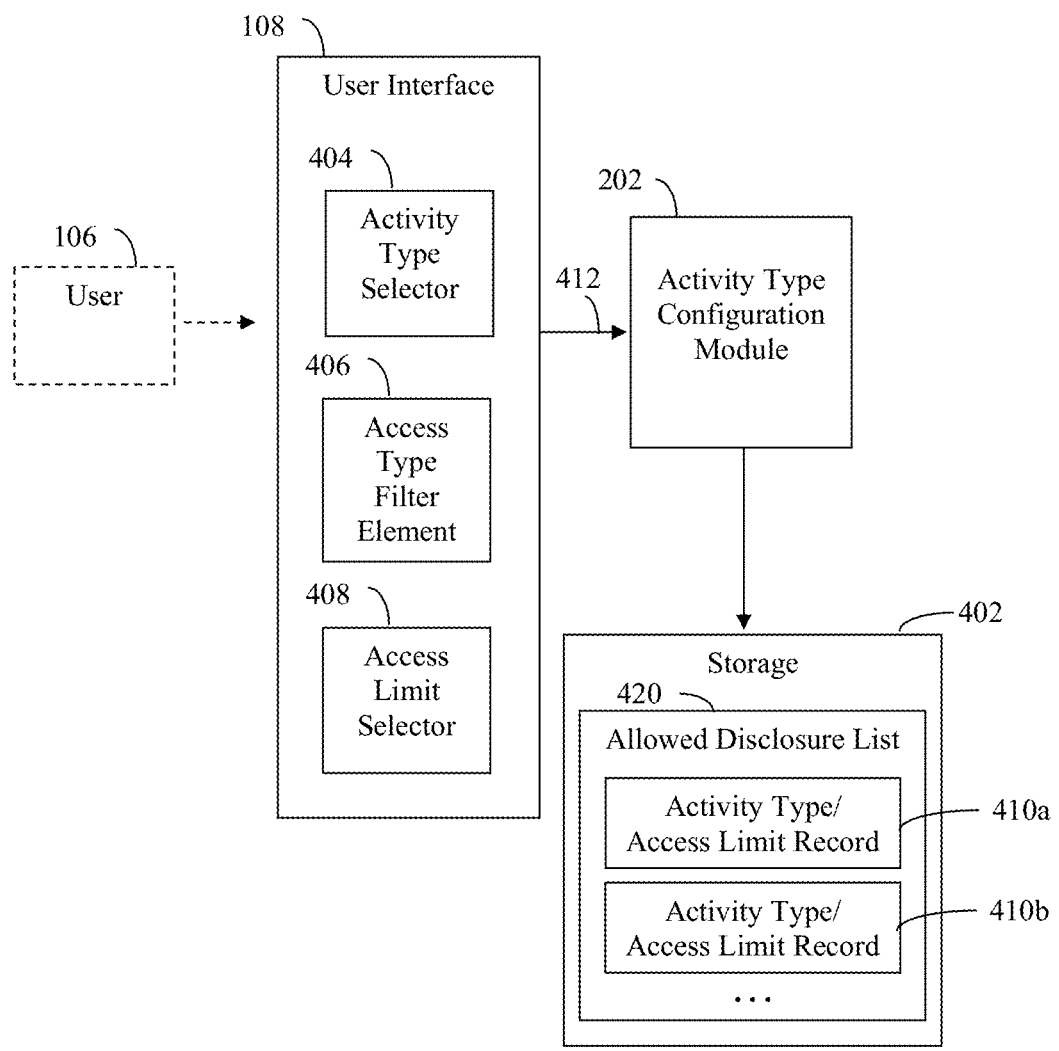
FIG. 4 shows a block diagram of an activity type configuration module configured to enable data sharing for an activity type, according to an example embodiment.

As described above, activity type configuration module 202 is configured to enable a user to define access limits for a particular type of user activity. Activity type configuration module 202 may perform these functions in various ways. For instance, FIG. 3 shows a flowchart 300 providing a process in a user device to configure data sharing for an activity type, according to an example embodiment. Activity type configuration module 202 may operate according to flowchart 300, in an embodiment. Flowchart 300 is described as follows with respect to FIG. 4. FIG. 4 shows a block diagram of activity type configuration module 202 configured to define access limits for data generated from user activities, according to an example embodiment. Further structural and operational embodiments will be apparent to persons skilled in the relevant art(s) based on the following description.

Flowchart 300 begins with step 302. In step 302, a nomination of an activity type is received. For example, with reference to FIG. 4, user 106 may be enabled to interact with user interface 108 to define an activity type to have access limits defined. For instance, in an embodiment, user interface 108 may provide an activity type selector 404. Activity type selector 404 is a user interface (UI) element configured to enable a user to select an activity type, such as by displaying a list of activity types from which a user may choose one, by enabling a user to input an activity type (e.g., by typing, by voice, etc.), and/or by another manner. The selected activity type is received by activity type configuration module 202 from user interface 108 in input information 412.

It is noted that an "activity type" is a category of activity related to the user (e.g., an activity that the user can perform, or is performed with respect to the user) for which activity data is or can be collected. Examples of activity types include a location-related activity (e.g., current location, changes of location, etc.), a messaging activity (a message sent or received, date/time of message, message sender and/or recipients, etc.), a calendar/scheduling activity (e.g., appointments, reminders, etc.), a social networking activity, game activities, a media object-related activity (capturing of images, video, audio, etc.), a dining activity (e.g., dining preferences of the user, actual dining out instances of the user, etc.), a work-related activity, etc.

Note that in an embodiment, user interface 108 may optionally display an access type filter element 406. Access type filter element 406 may be interacted with by the user to filter out one or more subsets of data entities for the selected activity type. For instance, access type filter element 406 may enable the user to filter out data entities for the selected activity type based on location, time, person (e.g., communications with a particular person), etc. The user filters are is received by activity type configuration module 202 in input information 412 with the corresponding activity type.

For instance, in one example, the user may select an activity type of "all activities," meaning the user desires to share all activity data that is collected by activity data sources (subject to the access limits further described with respect to step 304 below). However, the user may set a user filter to filter out activity data collected when the user (and user device 102) is in a particular location, such as a city (e.g., Las Vegas), country, or other region, from being shared. In the example of a user filter of the location of Las Vegas, when the user is in Las Vegas, the user's location, messages, restaurants at which the user eats, etc., are not shared (are filtered out). Additionally or alternatively, the user may set a user filter to filter out activity data collected during work hours (e.g., 9:00 am to 5:00 pm) during the week. In this manner, work-sensitive data entities are not shared. Still further, the user may set a user filter to filter out communication activities (e.g., messages) with a private contact. Any number, type, and combination of user filters may be configured.

In step 304, a selection of an access limit for access to data entities of the activity type is enabled to be made from a pre-defined plurality of access limits. For example, user 106 may be enabled to interact with user interface 108 to define an access limit to the activity type selected in step 302. In an embodiment, user interface 108 may provide an access limit selector 408 with which user 106 may interact to select access limits. For instance, access limit selector 408 may display a list of pre-defined access limits from which a user may select an access limit, may enable the user to input an access limit (e.g., by typing, by voice, etc.), and/or may enable an access limit to be configured in another manner. The selected access limit may be received by activity type configuration module 202 in input information 412 (along with the corresponding activity type).

It is noted that an "access limit" is a boundary of trust that defines a particular set of users and/or services that may access data entities falling under the corresponding activity type. Any number of access limits may be configured and/or pre-defined that each encompass a particular set of users and/or services, on-device and/or network-based.

Figure 5:
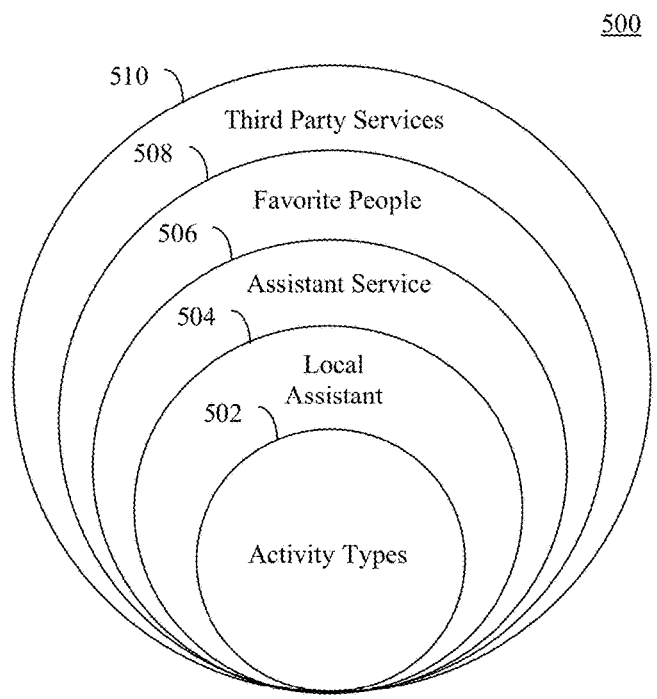
FIG. 5 shows a diagram of a series of nested circles defining various conceptual boundaries of trust, according to an example embodiment.

For instance, FIG. 5 shows a trust diagram 500 that is formed of a series of nested circles defining various boundaries of trust, according to an example embodiment. In the example of FIG. 5, trust diagram 500 includes five boundaries or limits, including an activity type limit 502, an on-device assistant service limit 504, a network-based assistant service limit 506, a favorite people limit 508, and a third party services limit 510. Any one or more of access limits 502-510 may be present and/or other type of access limits may be present that may be selected from.

Figure 6:
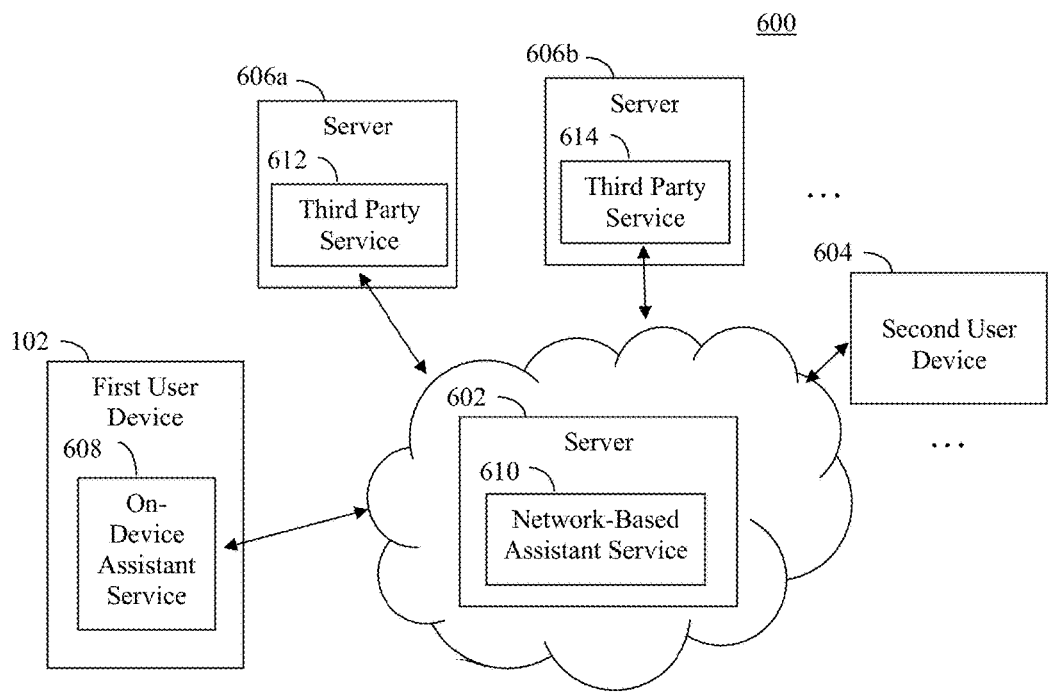
FIG. 6 shows a block diagram of a communication system in which a user device communicates with various other network-connected entities according to configurable levels of data privacy, according to an example embodiment.

Access limits 502-510 are described as follows with respect to FIG. 6. FIG. 6 shows a block diagram of a communication system 600 in which user device 102 may share data with various other network-connected entities according to configurable levels of data privacy, according to an example embodiment. As shown in FIG. 6, communication system 600 includes user device 102, a cloud-based server 602 that includes a network-based assistant service 610, a second user device 604, a server 606a that includes a third party service 612, and a server 606b that includes a third party service 614.

Activity type limit 502 is an access limit or boundary on the activity types themselves. If activity type limit 502 is selected for a particular activity type, data entities of the activity type may be collected (or may be prevented from being collected), but are not shared to any set of users/services.

On-device assistant service limit 504 is another type of access limit that, in the example of FIG. 5, is broader than and includes access type limit 502. When on-device assistant service limit 504 is selected by a user for an activity type, an electronic personal assistant on the user device has access to the data entities that fall under the activity type. For instance, on-device assistant service 608 (e.g., electronic personal assistant 110 of FIG. 1) of user device 102 in FIG. 6 may access the data entities, but other users/services may not access the data entities. If on-device assistant service 608 data entities, on-device assistant service 608 can perform reasoning over the data entities to provide enhanced assistance to the user based on an increased understanding of the user provided by the data entities.

Network-based assistant service limit 506 is another type of access limit that, in the example of FIG. 5, is broader than and includes on-device assistant service limit 504. When network-based assistant service limit 506 is selected by a user for an activity type, a network-based assistant service on the user device may additionally have access to the data entities that fall under the activity type. For instance, network-based assistant service 610 at server 602 (as well as on-device assistant service 608 on user device 102) may have access to the data entities, but other users/services may not access the data entities. Note that network-based assistant service 610 may be a back-end portion of an electronic personal assistant service that includes both on-device assistant service 608 and network-based assistant service 610. If network-based assistant service 610 is provided access to particular data entities, network-based assistant service 610 can enable further reasoning to be performed over the data entities to provide even more enhanced assistance to the user based on an increased understanding of the user provided.

For instance, network-based assistant service 610 may be provided with a data entity (e.g., a calendar appointment of the user's) indicating that the user is in a meeting (and indicating the user does not want to be disturbed), but may provide an alert to the user to head home from the meeting due to a traffic issue detected by network-based assistant service 610. Such assistance may not be possible with on-device assistant service 608 alone.

As shown in FIG. 6, second user device 604, third party service 612 at server 606a, and third party service 614 at server 606b are communicatively coupled network-based assistant service 610. In this manner, an electronic personal assistant (formed of on-device assistant service 608 and network-based assistant service 610) can provide access to these network-accessible services/users. The electronic personal assistant may answer questions, make recommendations/suggestions, and/or otherwise provide services to the user at user device 102 based on these network-accessible services/users.

Favorite people limit 508 is another type of access limit that, in the example of FIG. 5, is broader than and includes network-based assistant service limit 506. When favorite people limit 508 is selected by a user for an activity type, favorite people of the user (e.g., friends, family members, etc.) may additionally have access to the data entities that fall under the activity type. For instance, second user device 604 may be a device used by a friend or family member defined as a favorite person by the user, and thus hardware and processes/applications at second user device 604 may have access to the data entities (as well as services 608 and 610), but other users/services may not access the data entities. In an embodiment, the user may be enabled to interact with access limit selector 408 to define a set of favorite persons that are provided access to an activity type under favorite persons limit 508 (while other persons are excluded from access).

Third party services limit 510 is another type of access limit that, in the example of FIG. 5, is broader than and includes favorite people limit 508. When third party services limit 510 is selected by a user for an activity type, one or more on-device and/or network-based third-party services may additionally have access to the data entities that fall under the activity type. For instance, third-party service 612 at server 606a and third party service 614 at server 606b may each be provided with access to the data entities (as well as second user device 604 and services 608 and 610), but other users/services may not access the data entities. In an embodiment, the user may be enabled to verify particular third party services that are allowed. For instance, the user may interact with access limit selector 408 to define a set of third-party services that are provided access to an activity type under third party services limit 510 (while other third party services are excluded from access).

For example, third party service 612 may be a restaurant recommendation service. When third party service 612 is provided access to data entities falling under a location activity type of the user, third party service 612 can provide local restaurant recommendations to the user through on-device assistant service 608 based on a data entity indicating a current location of the user.

It is noted that the example of FIG. 5 is provided for purposes of illustration, and is not intended to be limiting. While, as shown in FIG. 5, access limits may be defined that are sequentially broader, containing other defined access limits entirely within (i.e., subsets), in other embodiments, access limits may be defined that are separate and distinct from other access limits. For example, an access limit for third party services may be defined that is separate from an access limit defined for friends of the user. In such an example, the user is enabled to use the third party service access limit to share data with third party services without sharing the data with friends, and is enabled to use the friends access limit to share data with friends without sharing the data with third party services. Furthermore, the access limits shown in FIG. 5 may have scopes that are different relative to each other than shown in FIG. 5. For instance, instead of favorite people limit 508 being a subset of third party services limit 510, third party services limit 510 may be configured as a subset of favorite people limit 508. Still further, multiple access limits of a similar type may be present, such a first third party services limit and a second third party services limits both being present to enable data sharing with different groups of third party services, etc.

Referring back to flowchart 300 in FIG. 3, in step 306, an activity monitor is configured to provide access to data entities of the activity type according to the selected access limit. In an embodiment, for each configured activity type/access limit, activity type configuration module 202 is configured to store an activity type/access limit record in an allowed disclosure list 420 in storage 402. As shown in FIG. 4, allowed disclosure list 420 includes a plurality of activity type/access limit records 410a, 410b, etc. Each activity type/access limit record indicates a selected activity type, the selected access limit for the activity type, and any (optional) user filters defined for the activity type. A group of activity types/access limits/user filters may be saved together as a privacy profile for the user. Such a privacy profile may be manually configured, as described with respect to flowchart 300, and/or may be automatically generated (or modified) as further described in Section IV below.

As described further below, activity monitor 204 of FIG. 2 is configured to provide access to data entities of activity types according to corresponding selected access limits. For instance, activity monitor 204 may access records stored in allowed disclosure list 420 in order to manage access to data entities.

Storage 402 may include one or more of any type of storage medium/device to store data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium/device.

III. Example Embodiments for Handling Activity Record Exposure Requests

Figure 7:
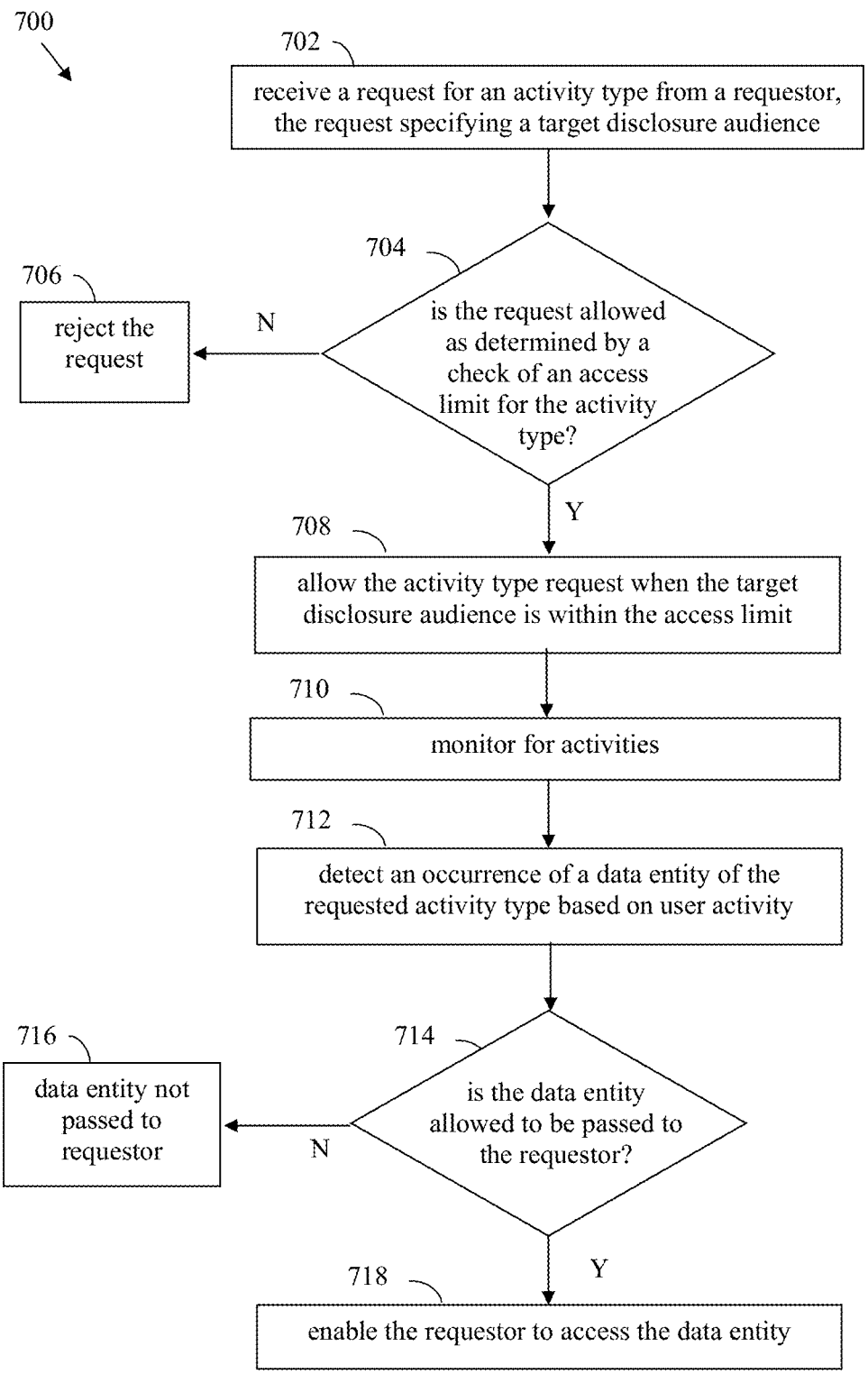
FIG. 7 shows a flowchart providing a process in a user device to handle activity record exposure requests, according to an example embodiment.
Figure 8:
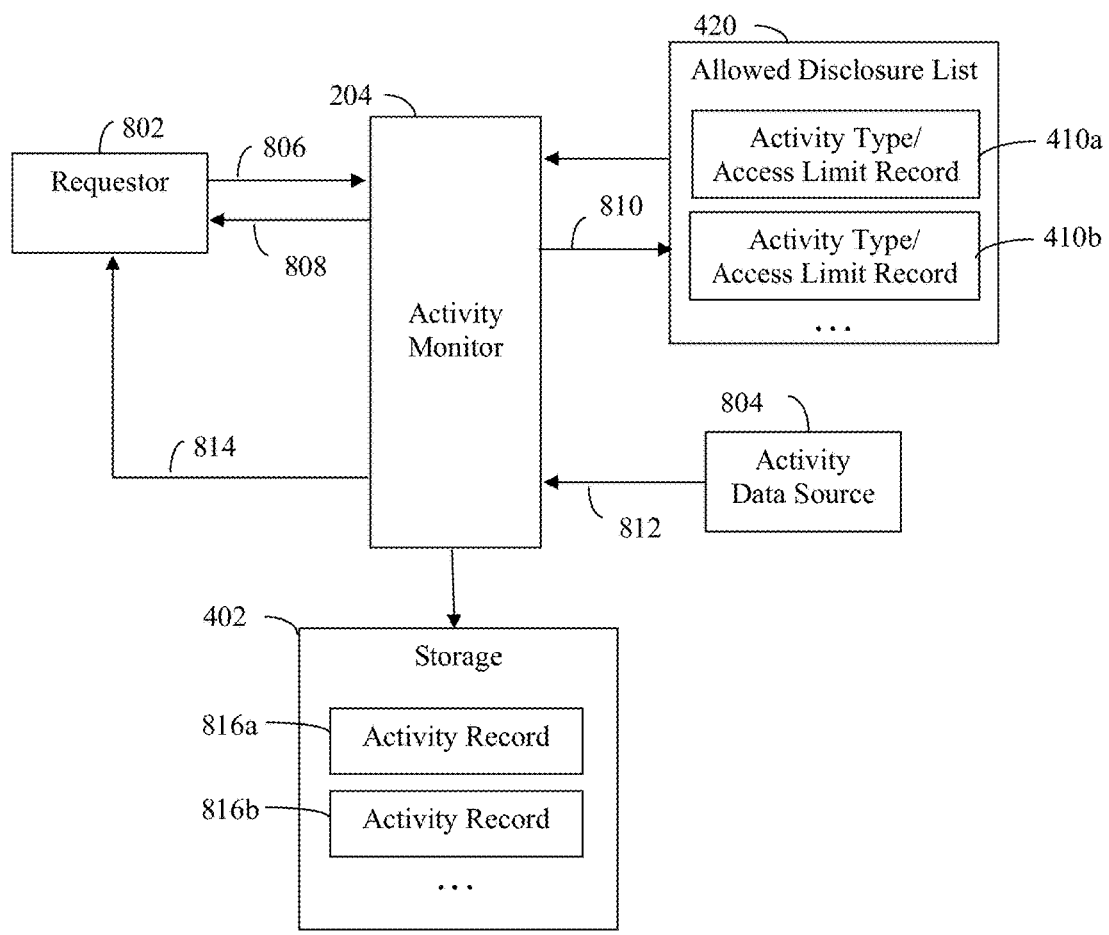
FIG. 8 shows a block diagram of an activity monitor configured to handle activity record exposure requests, according to an example embodiment.

As described above, activity monitor 204 is configured to handle activity record exposure requests from activity data requestors. Activity monitor 204 may perform these functions in various ways. For instance, FIG. 7 shows a flowchart 700 providing a process in a user device to handle activity record exposure requests, according to an example embodiment. Activity monitor 204 may operate according to flowchart 700, in an embodiment. Flowchart 700 is described as follows with respect to FIG. 8. FIG. 8 shows a block diagram of activity monitor 204 configured to handle activity record exposure requests, according to an example embodiment. Further structural and operational embodiments will be apparent to persons skilled in the relevant art(s) based on the following description.

Flowchart 700 begins with step 702. In step 702, a request is received for an activity type from a requestor, the request specifying a target disclosure audience. For instance, referring to FIG. 8, a requestor 802 may provide an activity type request 806 that is received by activity monitor 204. Requestor 802 may be implemented by electronic personal assistant 110 (FIG. 1) to retrieve data entities via activity manager 204 (in a privacy protected manner). The data entities may be processed directly by electronic personal assistant 110 (FIG. 1) to provide the user with assistance and/or may be provided to other services to provide the user with assistance via electronic personal assistant 110. Examples of such other services are shown in FIG. 1 as activity data requestors 116a, 116b, and 118 of FIG. 1.

In an embodiment, requestor 802 may be implemented as a process or application that implements a rule or an inference. A rule is a predetermined expression or other structure that processes data entities as inputs. An inference is a calculated understanding of the user based on their signals (data entities). In either case, a rule or inference of requestor 802 may desire particular data entities generated based on user activity for one or more particular activity types in order to provide a user with assistance.

Activity type request 806 identifies an activity type for which requestor 802 desires to receive data entities. Furthermore, activity type request 806 may identify a target disclosure audience, which includes one or more users and/or services. For instance, the target disclosure audience may include electronic personal assistant 110 itself, as well as one or more other on-device or network-based applications, third-party services, particular users, particular groups of users, etc. Operation proceeds to step 704.

In step 704, whether the request is allowed is determined by a check of an access limit for the activity type. For instance, activity monitor 204 may access allowed disclosure list 420 for the activity type/access limit record corresponding to the activity type indicated in activity type request 806. Activity monitor 204 may compare the target disclosure audience received in the request to the access limit defined in the corresponding activity type/access limit record to determine whether to allow the request. The access limit defined in the corresponding activity type/access limit record may be a default limit for activity types (e.g., limit 506 of FIG. 6) or may be an access limit defined by the user (e.g., according to flowchart 300 described above). If the target disclosure audience is outside of the defined access limit, operation proceeds to step 706. If the target disclosure audience is within the defined access limit, operation proceeds to step 708.

For instance, in one example, requestor 802 may be set up to provide user location information to a cloud-based restaurant recommendation application. In this case, requestor 802 may request a location activity type. If the access limit for a location activity type for the user is a third party services limit 510 that includes the restaurant recommendation application, the restaurant recommendation application may be allowed to receive data entities falling under the location activity type for the user. If the restaurant recommendation application falls outside of the defined access limit, the request may be rejected.

Note that in an alternative embodiment for step 704, even if request 806 indicates a target disclosure audience that falls outside an access limit for the activity type, some limited access may still be granted to requestor 802 for data entities falling under the activity. For instance, FIG. 10 shows a flowchart 1000 providing a process in a user device to handle such as situation, according to an example embodiment. Flowchart 1000 is described as follows.

In step 1002 of flowchart 1000, the target disclosure audience specified in the request is determined to fall outside of the access limit for the activity type. As described above, activity monitor 204 may compare the target disclosure audience received in request 802 to the access limit defined in the corresponding activity type/access limit record. The target disclosure audience may fall partially or completely outside of the defined access limit, which in the embodiment described above caused request 802 to be completely rejected.

However, in step 1004, access by the requestor is enabled to data entities that fall under the access limit for the activity type but not to data entities that fall outside of the access limit for the activity type. As such, in an embodiment, activity monitor 204 may allow access to a data entity of the activity type to requestor 802 when the disclosure audience for the data entity is a user/service that falls under the access limit defined for the activity type. This may have the benefit of eliminating back-and-forth requests for increasing levels of disclosure audience.

Referring back to FIG. 7, in step 706, the request is rejected. When request 806 is rejected by activity monitor 204, activity monitor 204 may optionally provide a request response 808 to requestor 802, indicating that request 806 was rejected. In any event, when request 806 is rejected, activity monitor 204 does not provide data entities to requestor 802 that fall under the indicated activity type.

In step 708, the activity type request is allowed when the target disclosure audience is within the access limit. When request 806 is allowed by activity monitor 204, activity monitor 204 may optionally provide request response 808 to requestor 802, indicating that request 806 was allowed. In an embodiment, activity monitor 204 may record an entry 810 in allowed disclosure list 420 (e.g., in the corresponding one of records 410*a*, 410*b*, etc.), or elsewhere, indicating that data entities may be provided to requestor 802 for the particular activity type. Operation proceeds to step 710.

In step 710, activities are monitored. In an embodiment, activity monitor 204 is configured to monitor data entities generated by various data sources (e.g., activity sources 114*a*, 114*b*, and 122 of FIG. 1). Activity monitor 204 determines an activity type of any received data entities (e.g., by the particular source, by metadata (e.g., data fields) included in the data entity, etc.). Activity monitor 204 is configured to compare the activity types of received data entities with the records of allowed disclosure list 420 to determine when a data entity is to be provided to a requestor. Operation proceeds to step 712.

Note that in an embodiment, activity monitor 204 may be configured to stop listening for data entities that fall outside of allowable conditions (e.g., stop listening for data entities that may not be passed to requestors due to restrictive access limits and/or due to user filters). In another embodiment, an activity data source may be instructed to not notify activity monitor 204 at all about data entities that are disallowed due to restrictive access limits and/or user filters prevent, and/or such data entities may be prevented from being provided to activity monitor 204 in other ways.

In step 712, a data entity of the requested activity type that occurs based on user activity is detected. In an embodiment, activity monitor 204 may determine that a received data entity is of a particular activity type that has a record in allowed disclosure list 420. For example, as shown in FIG. 8, an activity data source 804 may generate a data entity 812 that includes activity data of a particular activity type. The activity type associated with data entity 812 may be the activity type that was enabled for requestor 802, as described above. Operation proceeds to step 714.

In step 714, whether the data entity is allowed to be passed to the requestor is determined. By comparison of the determined activity type to the records stored in allowed disclosure list 420, activity monitor 204 may determine that requestor 802 (and potentially further requestors) is enabled to receive data entities of the particular activity type, and thus is allowed to be provided with the received data entity. In such case, operation proceeds to step 718. If requestor 802 is not enabled to receive data entities of the activity type, operation proceeds to step 716.

It is noted that in another embodiment for step 714, even if data entity 812 falls under the activity type enabled for requestor 802, data entity 812 may not be passed to requestor 802 due to a user filter. For instance, FIG. 9 shows a step 902 in a user device for filtering a received data entity, according to an example embodiment. In step 902, whether the data entity passes one or more user filters configured for the requested activity type is determined. As described above with respect to FIGS. 3 and 4, a user may configure user filters to filter out one or more subsets of data entities for a selected activity type. For instance, a user filter may be configured to filter out data entities based on location, time, person (e.g., communications with a particular person), etc.

Accordingly, in an embodiment, when activity monitor 204 determines that data entity 812 falls under an activity type designated for requestor 802, activity monitor 204 may also evaluate data entity 812 to determine whether it is filtered out by any user filters associated with the activity type. If activity monitor 204 determines that data entity 812 is not filtered out, operation proceeds to step 718. If activity monitor 204 determines that data entity 812 is filtered out, operation proceeds to step 716.

In step 716, the data entity is not passed to requestor. When data entity 812 does not fall under the activity type enabled for requestor 802, or is filtered out by a user filter for the activity type, data entity 812 is not passed to requestor 802.

In step 718, the requestor is enabled to access the data entity. When data entity 812 does fall under the activity type enabled for requestor 802 (and is not filtered out by any user filters), data entity 812 is passed to requestor 802. In such case, requestor 802 may be provided with the contents of data entity 812 itself, may be provided with a pointer to data entity 812 in storage, or may be enabled to access data entity 812 in some other manner. For instance, as shown in FIG. 8, storage 402 may store one or more activity records, such as activity records 816a, 816b, etc. Each activity record is a record of a particular data entity captured and stored by activity monitor 204. In an embodiment, requestor 802 may be provided with a pointer to an activity record in storage 402 to be provided with a particular data entity. An activity record may contain various information associated with a data entity, including an indication of an identifier for the data entity, metadata associated with the data entity (e.g., a time field for a date/time of an occurrence of the data entity, a location of the user during the occurrence, etc.), a pointer to the data entity elsewhere in storage, the contents of the data entity itself, etc.

As shown in FIG. 8, when the data entity is allowed to be passed to requestor 802, activity monitor 204 transmits a data entity access signal 814 that is received by requestor 802. Data entity access signal 814 may include data entity 812, may include a pointer to an activity record for data entity 812 in storage 402, or may provide access to data entity 812 in another manner.

Note that as described above, when an activity type request is allowed (in step 708), requestor 802 is enabled to receive a data entity that falls under the activity type of the request. In one embodiment, requestor 802 is enabled to receive a single data entity that falls under the activity type request, and needs to submit another activity type request to be allowed to receive a next data entity falling under the activity type (e.g., a one-to-one relationship exists between an activity type request and a received data entity). In another embodiment, when an activity type request is allowed, requestor 802 may be enabled to receive multiple data entities (e.g., a stream of subsequently received data entities) that fall under the activity type of the request.

Furthermore, when an activity type request is allowed (in step 708), an activity data requestor, on whose behalf requestor 802 made the activity type request, may be provided with the data entities received by requestor 802 that fall under the activity type. In one embodiment, the activity data requestor may be notified of a data entity received by requestor 802, and may query requestor 802 for the data entity (a pull mode). In another embodiment, requestor 802 may automatically provide a received data entity to the activity data requestor (a push mode).

In still another embodiment, an activity data requester may enter into a subscription for data entities that fall under an activity type. The subscription may enable the activity data requestor to access the data entities received by requestor 802 according to the push mode or the pull mode. The subscription may place a limit on a number of data entities to be provided, may set a time frame within which data entities may be provided, or may place another limit on providing data entities to the activity data requestor.

Figure 11:
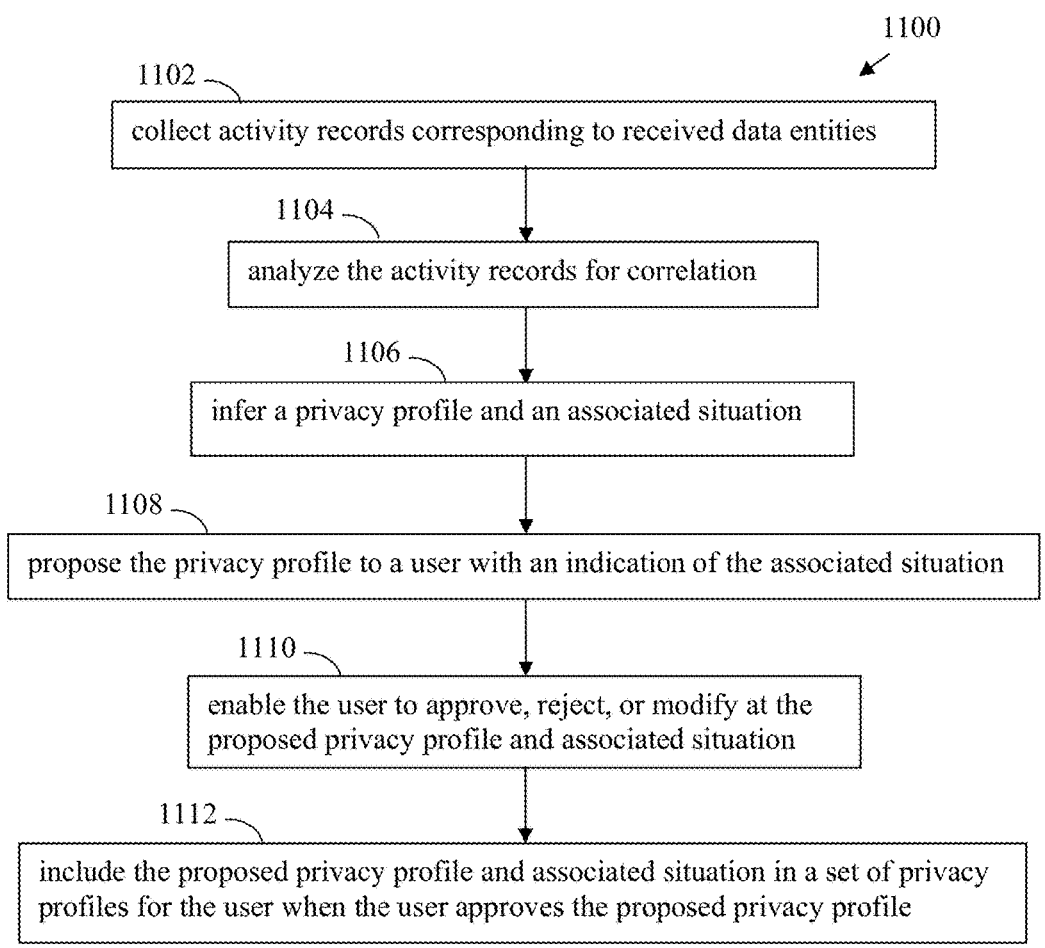
FIG. 11 shows a flowchart providing a process in a user device to automatically generate a privacy profile for a user, according to an example embodiment.
Figure 12:
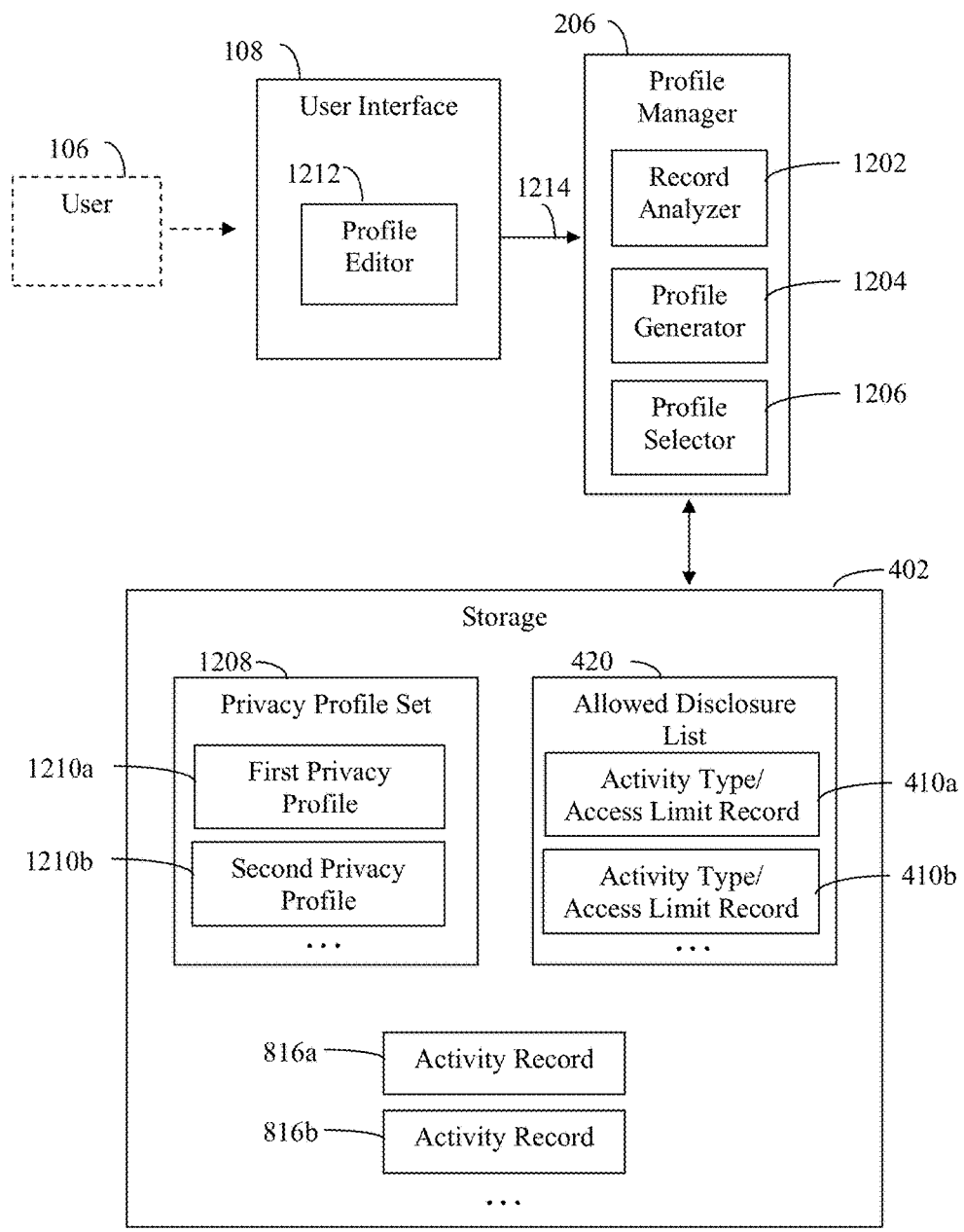
FIG. 12 shows a block diagram of a profile manager configured to automatically generate and enact privacy profiles for a user, according to an example embodiment.

IV. Example Embodiments for Automatically Generating and Enacting Exposure Profiles As described above, profile manager 206 is configured to automatically generate exposure profiles, and detect situations where an exposure profile may be automatically enacted. Profile manager 206 may perform these functions in various ways. For instance, FIG. 11 shows a flowchart 1100 providing a process in a user device to automatically generate a privacy profile for a user, according to an example embodiment. Profile manager 206 may operate according to flowchart 1100, in an embodiment. Flowchart 1100 is described as follows with respect to FIG. 12. FIG. 12 shows a block diagram of profile manager 206 configured to automatically generate and enact privacy profiles for a user, according to an example embodiment. Further structural and operational embodiments will be apparent to persons skilled in the relevant art(s) based on the following description.

Flowchart 1100 begins with step 1102. In step 1102, activity records corresponding to received data entities are collected. For example, as described above, activity monitor 204 may be configured to capture and store activity records, such as activity records 816a, 816b, etc., in storage 402. The activity records each correspond to a corresponding data entity received by activity monitor 204.

In step 1104, the activity records are analyzed for correlation. In an embodiment, as shown in FIG. 12, profile manager 206 may include a record analyzer 1202, a profile generator 1204, and a profile selector 1206. Record analyzer 1202 is configured to access activity records stored in storage 402, aggregate the accessed activity records, and to analyze the aggregated activity records. For example, record analyzer 1202 may analyze activity records to determine correlations between them. For instance, record analyzer 1202 may compare activity records that were generated around a same time and/or during a particular time period, at a same location, with regard to a same set of one or more people involved, and/or based on any other similarity. Record analyzer 1202 may generate correlation information that indicates any determined correlation between the activity records.

In step 1106, a privacy profile and an associated situation are inferred. In an embodiment, based on the correlation information generated by record analyzer 1202, profile generator 1204 may determine a situation for the user and may generate a privacy profile corresponding to that particular situation. The generated privacy profile may indicate one or more activity types for the user, and a proposed access limit for each indicated activity type.

For instance, the correlation information may indicate the user works Sunday-Thursday during a time period of 6 am to 2 pm each day, based on a location of the user on each of those days during that time period, calendar appointments of the user during that time period, and/or further activity records. In response, profile generator 1204 may generate a first privacy profile 1210a for the user, which may be stored in storage 402 in a privacy profile set 1208 for the user (if the privacy profile is saved by the user, as described below). First privacy profile 1210a may be a work privacy profile, which is tailored towards privacy issues related to the work place. For instance, first privacy profile 1210a may place reduced access limits (e.g., limits 502, 504, or 506) on messaging activity types, calendar activity types, etc., to provide the user with enhanced privacy during work.

In another example, the correlation information may indicate the user is on vacation in Hawaii, based on a location of the user, a lack of calendar appointments of the user other than a single appointment lasting several days, social messages that include words associated with Hawaii, restaurant reviews provided by the user in Hawaii, and/or further activity records. In response, profile generator 1204 may generate a second privacy profile 1210b for the user stored in privacy profile set 1208 for the user. Second privacy profile 1210b may be a vacation privacy profile, which is tailored towards privacy issues related to being on vacation. For instance, first privacy profile 1210a may place reduced access limits (e.g., limits 502, 504, or 506) on messaging activity types to avoid the user being bothered, higher access limits on social network and location related activities (e.g., limits 508 or 510) to show off to friends and/or enable restaurant and other activity-related recommendations to be provided by an electronic personal assistant, etc. Any type of privacy profile may be generated, including a home privacy profile, an exercise privacy profile, a shopping privacy profile, etc.

In step 1108, the privacy profile is proposed to a user with an indication of the associated situation. In an embodiment, as shown in FIG. 12, user interface 108 may be displayed to show the privacy profile generated by profile generator 1204 to user 106.

In step 1110, the user is enabled to approve, reject, or modify at the proposed privacy profile and associated situation. In an embodiment, user 106 may be enabled to interact with a profile editor 1212 provided in user interface 108 to review, approve, reject, and/or modify the proposed privacy profile. For instance, in an embodiment, profile editor 1212 may display one or more activity types and access limits proposed for the privacy profile, as well as indicating the associated situation (e.g., work, vacation, home, exercise, shopping, at the movies, etc.). Profile editor 1212 may provide one or more user interface elements to enable the user to add or remove activity types, and to configure corresponding access limits for the displayed activity types. Profile editor 1212 may further provide "approve" and "reject" selections (e.g., virtual buttons, etc.) that user 106 may interact with to approve or reject the proposed privacy profile.

In step 1112, the proposed privacy profile and associated situation are included in a set of privacy profiles for the user when the user approves the proposed privacy profile. When user 106 approves a proposed privacy profile through interaction with user interface 108, user interface 108 provides a save indication 1214 that is received by profile generator 1204. In response to save indication 1214, the privacy profile may be saved in privacy profile set 1208.

Figure 13:
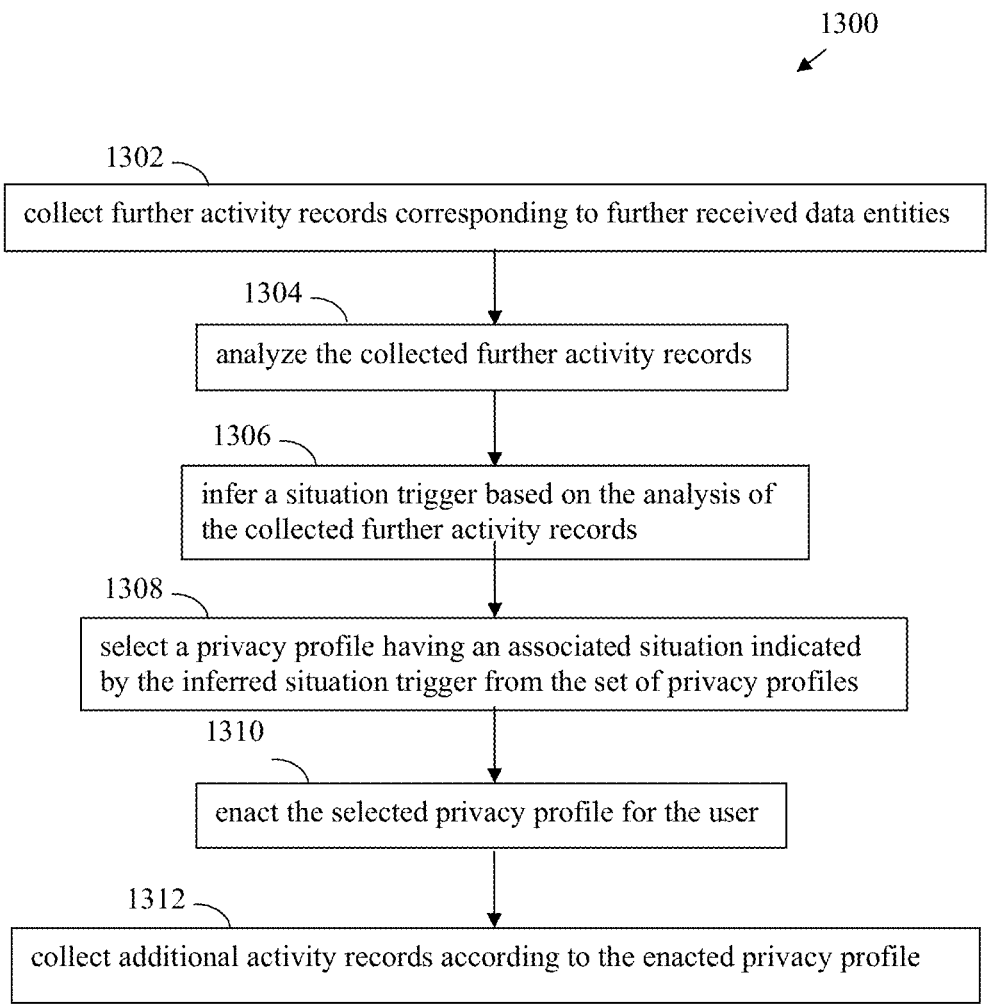
FIG. 13 shows a flowchart providing a process in a user device to automatically enact a privacy profile for a user, according to an example embodiment.

As described above, profile manager 206 is configured to enact privacy profiles when their corresponding situations arise. For instance, FIG. 13 shows a flowchart 1300 providing a process in a user device to automatically enact a privacy profile for a user, according to an example embodiment. Profile manager 206 may operate according to flowchart 1300, in an embodiment. Flowchart 1300 is described as follows with respect to FIG. 12.

Flowchart 1300 begins with step 1302. In step 1302, further activity records corresponding to further received data entities are collected. As described above, activity monitor 204 may continuously capture and store activity records in storage 402. The activity records each correspond to a corresponding data entity received by activity monitor 204.

In step 1304, the collected further activity records are analyzed. In an embodiment, profile selector 1206 is configured to analyze the further collected activity records.

In step 1306, a situation trigger is inferred based on the analysis of the collected further activity records. Profile selector 1206 analyzes the collected activity records to detect a situation corresponding to a stored privacy profile. For instance, profile selector 1206 may compare activity data of the collected activity records (e.g., a date/time, a location, associated persons, etc.) with activity data that is indicative of a particular situation (e.g., a work time period, locations that indicate vacation, persons who are friends of the user, etc.). The comparison may be used by profile selector 1206 to determine activity data that indicates that a situation of a privacy profile in privacy profile set 1208 is presently occurring (a "situation trigger").

In step 1308, a privacy profile having an associated situation indicated by the inferred situation trigger is selected from the set of privacy profiles. When the analysis of activity records indicates a situation trigger, profile selector 1206 is configured to select the privacy profile corresponding to the situation from privacy profile set 1208.

In step 1310, the selected privacy profile is enacted for the user. Profile selector 1206 is configured to reconfigure allowed disclosure list 420 according to the selected privacy profile. As such, activity type/access limit records from the selected privacy profile are listed in allowed disclosure list 420 (to replace the prior records in list 420) to provide the activity types and access limits of the selected privacy profile for subsequent data entities. Accordingly, activity monitor 204 may operate as described above (e.g., with respect to flowchart 700 of FIG. 7) using the privacy settings of the selected privacy profile for subsequently received data entities.

In step 1312, additional activity records are collected according to the enacted privacy profile. As described above, activity monitor 204 may receive and handle privacy for received data entities according to the selected privacy profile. Activity monitor 204 may further store activity records, such as activity records 816a, 816b, etc., in storage 402 for further privacy profile analysis, as described above.

Note that in an embodiment, user 106 may interact with user interface 108 to manually select a privacy profile from privacy profile set 1208 to be enacted for the user on user device 102. For example, a list of privacy profiles of privacy profile set 1208 may be displayed by user interface 108, and the user may be enabled to select a privacy profile from the list. Alternatively, the user may be enabled to manually select a privacy profile for enactment in another manner.

Still further, the user 106 may interact with user interface 108 to delete activity records (e.g., activity records 816a, 816b, etc.) in storage 402, as desired. For instance, user 106 may not want particular activity records to be stored, and may select such activity records for deletion using user interface 108. User interface 108 may enable user 106 to select activity records individually or according to a particular criteria, such as by activity type, etc., and the user may be enabled to delete the selected activity records by interacting with a user interface element of user interface 108.

V. Example Mobile and Stationary Device Embodiments

User device 102, user interface 108, electronic personal assistant 110, network interface 112, activity data source 114*a*, activity data source 114*b*, activity data requestor 116*a*, activity data requestor 116*b*, activity data requestor 118, data privacy manager 120, activity data source 122, data privacy manager 200, activity type configuration module 202, activity monitor 204, profile manager 206, server 602, second user device 604, server 606*a*, server 606*b*, on-device assistant service 608, network-based assistant service 610, third party service 612, third party service 614, requestor 802, activity data source 804, record analyzer 1202, profile generator 1204, profile selector 1206, flowchart 300, flowchart 700, flowchart 900, step 1002, flowchart 1100, and flowchart 1300 may be implemented in hardware, or hardware combined with software and/or firmware. For example, user device 102, user interface 108, electronic personal assistant 110, network interface 112, activity data source 114*a*, activity data source 1146, activity data requestor 116*a*, activity data requestor 116*b*, activity data requestor 118, data privacy manager 120, activity data source 122, data privacy manager 200, activity type configuration module 202, activity monitor 204, profile manager 206, server 602, second user device 604, server 606*a*, server 606*b*, on-device assistant service 608, network-based assistant service 610, third party service 612, third party service 614, requestor 802, activity data source 804, record analyzer 1202, profile generator 1204, profile selector 1206, flowchart 300, flowchart 700, flowchart 900, step 1002, flowchart 1100, and/or flowchart 1300 may be implemented as computer program code/instructions configured to be executed in one or more processors and stored in a computer readable storage medium. Alternatively, user device 102, user interface 108, electronic personal assistant 110, network interface 112, activity data source 114*a*, activity data source 114*b*, activity data requestor 116*a*, activity data requestor 116*b*, activity data requestor 118, data privacy manager 120, activity data source 122, data privacy manager 200, activity type configuration module 202, activity monitor 204, profile manager 206, server 602, second user device 604, server 606*a*, server 606*b*, on-device assistant service 608, network-based assistant service 610, third party service 612, third party service 614, requestor 802, activity data source 804, record analyzer 1202, profile generator 1204, profile selector 1206, flowchart 300, flowchart 700, flowchart 900, step 1002, flowchart 1100, and/or flowchart 1300 may be implemented as hardware logic/electrical circuitry.

For instance, in an embodiment, one or more, in any combination, of user device 102, user interface 108, electronic personal assistant 110, network interface 112, activity data source 114*a*, activity data source 114*b*, activity data requestor 116*a*, activity data requestor 116*b*, activity data requestor 118, data privacy manager 120, activity data source 122, data privacy manager 200, activity type configuration module 202, activity monitor 204, profile manager 206, server 602, second user device 604, server 606*a*, server 606*b*, on-device assistant service 608, network-based assistant service 610, third party service 612, third party service 614, requestor 802, activity data source 804, record analyzer 1202, profile generator 1204, profile selector 1206, flowchart 300, flowchart 700, flowchart 900, step 1002, flowchart 1100, and/or flowchart 1300 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits and/or embedded firmware to perform its functions.

Figure 14:
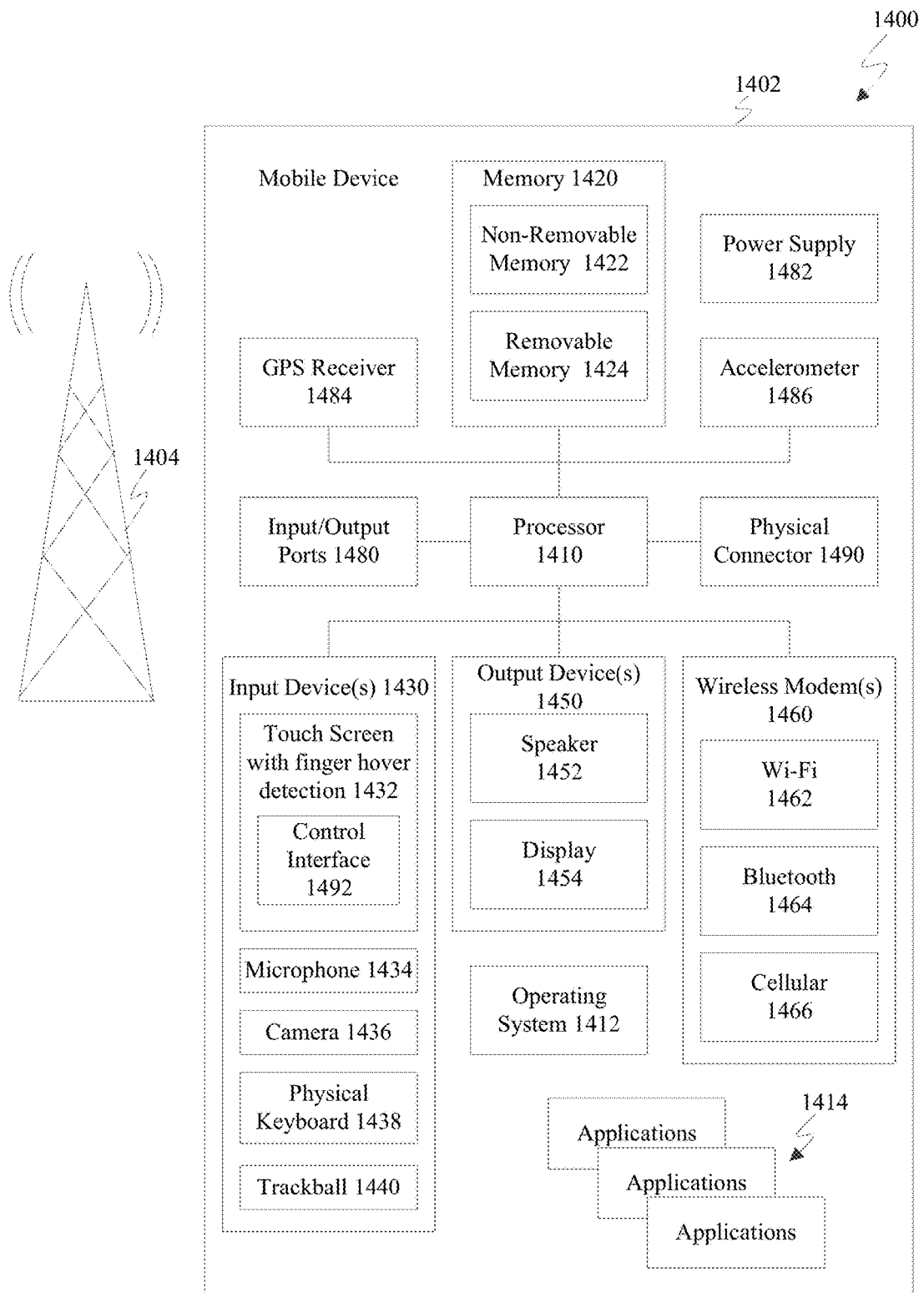
FIG. 14 shows a block diagram of an exemplary user device in which embodiments may be implemented.

FIG. 14 shows a block diagram of an exemplary mobile device 1400 including a variety of optional hardware and software components, shown generally as components 1402. For instance, components 1402 of mobile device 1400 are examples of components that may be included in user device 102, server 602, second user device 604, server 606*a*, and/or server 606*b* in mobile device embodiments. Any number and combination of the features/elements of components 1402 may be included in a mobile device embodiment, as well as additional and/or alternative features/elements, as would be known to persons skilled in the relevant art(s). It is noted that any of components 1402 can communicate with any other of components 1402, although not all connections are shown, for ease of illustration. Mobile device 1400 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 1404, such as a cellular or satellite network, or with a local area or wide area network.

The illustrated mobile device 1400 can include a controller or processor 1410 (e.g., signal processor, microprocessor, ASIC, or other control and processing logic circuitry) for performing such tasks as signal coding, data processing, input/output processing, power control, and/or other functions. An operating system 1412 can control the allocation and usage of the components 1402 and support for one or more application programs 1414 (a.k.a. applications, "apps", etc.). Application programs 1414 can include common mobile computing applications (e.g., email applications, calendars, contact managers, web browsers, messaging applications) and any other computing applications (e.g., word processing applications, mapping applications, media player applications).

As illustrated, mobile device 1400 can include memory 1420. Memory 1420 can include non-removable memory 1422 and/or removable memory 1424. The non-removable memory 1422 can include RAM, ROM, flash memory, a hard disk, or other well-known memory storage technologies. The removable memory 1424 can include flash memory or a Subscriber Identity Module (SIM) card, which is well known in GSM communication systems, or other well-known memory storage technologies, such as "smart cards." The memory 1420 can be used for storing data and/or code for running the operating system 1412 and the applications 1414. Example data can include web pages, text, images, sound files, video data, or other data sets to be sent to and/or received from one or more network servers or other devices via one or more wired or wireless networks. Memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of program modules may be stored in memory 1420. These programs include operating system 1412, one or more application programs 1414, and other program modules and program data. Examples of such application programs or program modules may include, for example, computer program logic (e.g., computer program code or instructions) for implementing user interface 108, electronic personal assistant 110, network interface 112, activity data source 114a, activity data source 114b, activity data requestor 116a, activity data requestor 116b, activity data requestor 118, data privacy manager 120, activity data source 122, data privacy manager 200, activity type configuration module 202, activity monitor 204, profile manager 206, on-device assistant service 608, network-based assistant service 610, third party service 612, third party service 614, requestor 802, activity data source 804, record analyzer 1202, profile generator 1204, profile selector 1206, flowchart 300, flowchart 700, flowchart 900, step 1002, flowchart 1100, and/or flowchart 1300 (including any step of flowcharts 300, 700, 900, 1100, and 1300), and/or further embodiments described herein.

Mobile device 1400 can support one or more input devices 1430, such as a touch screen 1432, microphone 1434, camera 1436, physical keyboard 1438 and/or trackball 1440 and one or more output devices 1450, such as a speaker 1452 and a display 1454. Touch screens, such as touch screen 1432, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 1432 may be configured to support finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches or between 0.75 inches and 1 inch, or between 1 inch and 1.5 inches, etc.

The touch screen 1432 is shown to include a control interface 1492 for illustrative purposes. The control interface 1492 is configured to control content associated with a virtual element that is displayed on the touch screen 1432. In an example embodiment, the control interface 1492 is configured to control content that is provided by one or more of applications 1414. For instance, when a user of the mobile device 1400 utilizes an application, the control interface 1492 may be presented to the user on touch screen 1432 to enable the user to access controls that control such content. Presentation of the control interface 1492 may be based on (e.g., triggered by) detection of a motion within a designated distance from the touch screen 1432 or absence of such motion. Example embodiments for causing a control interface (e.g., control interface 1492) to be presented on a touch screen (e.g., touch screen 1432) based on a motion or absence thereof are described in greater detail below.

Other possible output devices (not shown) can include piezoelectric or other haptic output devices. Some devices can serve more than one input/output function. For example, touch screen 1432 and display 1454 can be combined in a single input/output device. The input devices 1430 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1412 or applications 1414 can comprise speech-recognition software as part of a voice control interface that allows a user to operate the device 1400 via voice commands. Further, the device 1400 can comprise input devices and software that allows for user interaction via a user's spatial gestures, such as detecting and interpreting gestures to provide input to a gaming application.

Wireless modem(s) 1460 can be coupled to antenna(s) (not shown) and can support two-way communications between the processor 1410 and external devices, as is well understood in the art. The modem(s) 1460 are shown generically and can include a cellular modem 1466 for communicating with the mobile communication network 1404 and/or other radio-based modems (e.g., Bluetooth 1464 and/or Wi-Fi 1462). Cellular modem 1466 may be configured to enable phone calls (and optionally transmit data) according to any suitable communication standard or technology, such as GSM, 3G, 4G, 5G, etc. At least one of the wireless modem(s) 1460 is typically configured for communication with one or more cellular networks, such as a GSM network for data and voice communications within a single cellular network, between cellular networks, or between the mobile device and a public switched telephone network (PSTN).

Mobile device 1400 can further include at least one input/output port 1480, a power supply 1482, a satellite navigation system receiver 1484, such as a Global Positioning System (GPS) receiver, an accelerometer 1486, and/or a physical connector 1490, which can be a USB port, IEEE 1394 (FireWire) port, and/or RS-232 port. The illustrated components 1402 are not required or all-inclusive, as any components can be not present and other components can be additionally present as would be recognized by one skilled in the art.

Figure 15:
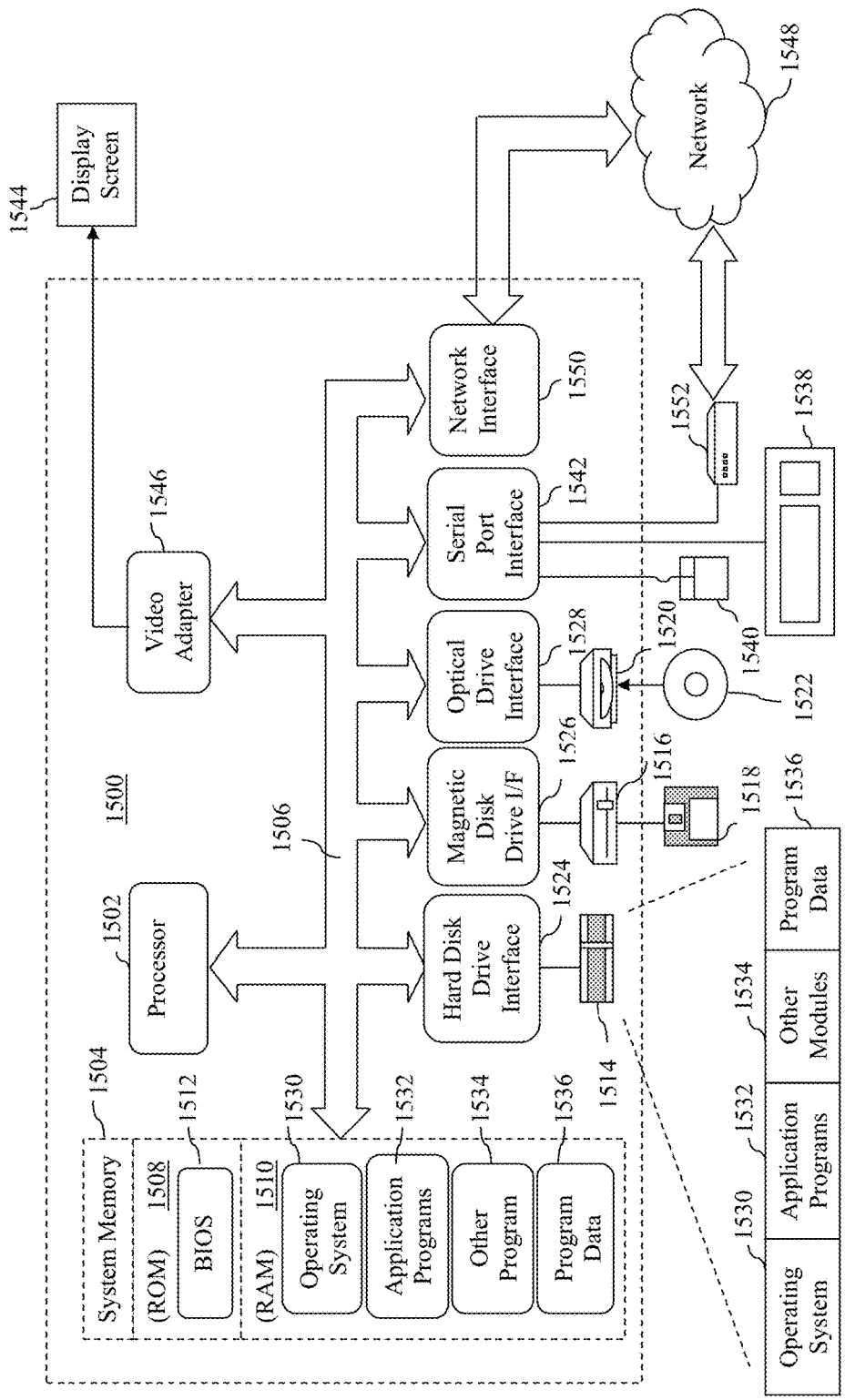
FIG. 15 shows a block diagram of an example computing device that may be used to implement embodiments.

Furthermore, FIG. 15 depicts an exemplary implementation of a computing device 1500 in which embodiments may be implemented. For example, user device 102, server 602, second user device 604, server 606a, and/or server 606b may be implemented in one or more computing devices similar to computing device 1500 in stationary computer embodiments, including one or more features of computing device 1500 and/or alternative features. The description of computing device 1500 provided herein is provided for purposes of illustration, and is not intended to be limiting. Embodiments may be implemented in further types of computer systems, as would be known to persons skilled in the relevant art(s).

As shown in FIG. 15, computing device 1500 includes one or more processors 1502, a system memory 1504, and a bus 1506 that couples various system components including system memory 1504 to processor 1502. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

Computing device 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, RAMs, ROMs, and the like.

A number of program modules may be stored on the hard disk, magnetic disk, optical disk, ROM, or RAM. These programs include an operating system 1530, one or more application programs 1532, other program modules 1534, and program data 1536. Application programs 1532 or program modules 1534 may include, for example, computer program logic (e.g., computer program code or instructions) for implementing user interface 108, electronic personal assistant 110, network interface 112, activity data source 114a, activity data source 114b, activity data requestor 116a, activity data requestor 116b, activity data requestor 118, data privacy manager 120, activity data source 122, data privacy manager 200, activity type configuration module 202, activity monitor 204, profile manager 206, on-device assistant service 608, network-based assistant service 610, third party service 612, third party service 614, requestor 802, activity data source 804, record analyzer 1202, profile generator 1204, profile selector 1206, flowchart 300, flowchart 700, flowchart 900, step 1002, flowchart 1100, and/or flowchart 1300 (including any step of flowcharts 300, 700, 900, 1100, and 1300), and/or further embodiments described herein.

A user may enter commands and information into the computing device 1500 through input devices such as keyboard 1538 and pointing device 1540. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor 1502 through a serial port interface 1542 that is coupled to bus 1506, but may be connected by other interfaces, such as a parallel port, game port, or a universal serial bus (USB).

A display screen 1544 is also connected to bus 306 via an interface, such as a video adapter 1546. Display screen 1544 may be external to, or incorporated in computing device 1500. Display screen 1544 may display information, as well as being a user interface for receiving user commands and/or other information (e.g., by touch, finger gestures, virtual keyboard, etc.). In addition to display screen 1544, computing device 1500 may include other peripheral output devices (not shown) such as speakers and printers.

Computing device 1500 is connected to a network 1548 (e.g., the Internet) through an adaptor or network interface 1550, a modem 1552, or other means for establishing communications over the network. Modem 1552, which may be internal or external, may be connected to bus 1506 via serial port interface 1542, as shown in FIG. 15, or may be connected to bus 1506 using another interface type, including a parallel interface.

As used herein, the terms "computer program medium," "computer-readable medium," and "computer-readable storage medium" are used to generally refer to media such as the hard disk associated with hard disk drive 1514, removable magnetic disk 1518, removable optical disk 1522, other media such as flash memory cards, digital video disks, RAMs, ROMs, and further types of physical/tangible storage media (including memory 1420 of FIG. 14). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1532 and other program modules 1534) may be stored on the hard disk, magnetic disk, optical disk, ROM, or RAM. Such computer programs may also be received via network interface 1550, serial port interface 1542, or any other interface type. Such computer programs, when executed or loaded by an application, enable computing device 1500 to implement features of embodiments discussed herein. Accordingly, such computer programs represent controllers of the computing device 1500.

Embodiments of the invention are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include storage devices such as RAM, hard drives, floppy disks, CD ROMs, DVD ROMs, zip disks, tapes, magnetic storage devices, optical storage devices, MEMs, nanotechnology-based storage devices, and further types of physical/tangible computer readable storage media.

In another embodiment, a method in a user device comprises: receiving a nomination of an activity type; enabling a selection of an access limit for access to data entities of the activity type from a pre-defined plurality of access limits; and configuring an activity monitor to provide access to data entities of the activity type according to the selected access limit.

In an embodiment, said enabling comprises: configuring the access limit with a filter that filters a subset of data entities associated with the activity type.

In an embodiment, the pre-defined plurality of access limits includes at least one of an activity type limit, an on-device assistant service limit, a network-based assistant service limit, a favorite people limit, or a third party services limit.

In another embodiment, a user device comprises: at least one processor; and a storage device that stores one or more computer programs for execution by the at least one processor, the one or more computer programs including an activity monitor that includes instructions configured to perform a method that comprises: receiving a request for an activity type from a requestor, the request specifying a target disclosure audience, checking an access limit for the activity type, and allowing the activity type request when the target disclosure audience is within the access limit.

In an embodiment, said checking comprises: checking a default access limit.

In an embodiment, said checking comprises: checking an access limit configured by a user for the activity type.

In an embodiment, the method further comprises: when the activity type request was allowed, monitoring for activities that generate data entities that fall under the activity type.

In an embodiment, the method further comprises: when the activity type request was allowed, detecting an occurrence of a data entity of the requested activity type based on user activity, and enabling the requestor to access the data entity.

In an embodiment, at least one user filter is configured for the requested activity type, and the user device further comprises: when the activity type request was allowed, detecting an occurrence of a data entity of the requested activity type based on user activity, determining whether the data entity passes the at least one user filter configured for the requested activity type, and enabling the requestor to access the data entity if the data entity passes the at least one user filter.

In an embodiment, the method further comprises: when the activity type request is allowed, registering the activity monitor to listen to specific data entities according to at least one user filter.

In an embodiment, the method further comprises: rejecting the activity type if the target disclosure audience specified in the request falls outside of the access limit for the activity type.

In an embodiment, the method further comprises: determining that the target disclosure audience specified in the request falls outside of the access limit for the activity type; and enabling access by the requestor to data entities that fall under the access limit for the activity type but not to data entities that fall outside of the access limit for the activity type.

In another embodiment, a method in a user device comprises: collecting activity records corresponding to received data entities; analyzing the activity records for correlation; inferring a privacy profile and an associated situation based on said analyzing; proposing the privacy profile to a user with an indication of the associated situation; enabling the user to approve, reject, or modify at the proposed privacy profile and associated situation; and including the proposed privacy profile and associated situation in a set of privacy profiles for the user when the user approves the proposed privacy profile.

In an embodiment, the method further comprises: collecting further activity records corresponding to further received data entities; analyzing the collected further activity records; inferring a situation trigger based on said analyzing of the collected further activity records; selecting a privacy profile having an associated situation indicated by the inferred situation trigger from the set of privacy profiles; and enacting the selected privacy profile for the user.

In an embodiment, the method further comprises: collecting additional activity records according to the enacted privacy profile.

In an embodiment, said inferring a privacy profile and an associated situation based on said analyzing comprises: generating the privacy profile to indicate an activity type and an associated access limit for the activity type, the associated access limit selected from a pre-defined plurality of access limits.

In an embodiment, said inferring a privacy profile and an associated situation based on said analyzing comprises: generating the privacy profile to indicate a plurality of activity types and corresponding access limits.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a user device, comprising:
receiving a selection of an activity type from a plurality of activity types;
providing, for selection, a pre-defined plurality of access limits for access to data entities of the activity type;
receiving a selection of an access limit from the pre-defined plurality of access limits;
configuring the access limit with a filter that filters received data entities of the activity type based on location; and
configuring an activity monitor to provide access to data entities of the activity type according to the access limit and filter.

2. The method of claim 1, wherein the filter is configured to filter the received data entities based on a location of the user device.

3. The method of claim 1, wherein said configuring the access limit with a filter that filters received data entities of the activity type based on location comprises:
providing a user interface configured for user interaction to configure the access limit with the filter.

4. The method of claim 1, wherein the pre-defined plurality of access limits includes at least one of an activity type limit, an on-device assistant service limit, a network-based assistant service limit, a favorite people limit, or a third-party services limit.

5. A user device, comprising:
at least one processor; and
a storage device that stores one or more computer programs for execution by the at least one processor, the one or more computer programs including an activity monitor that includes instructions configured to perform a method that comprises:
receiving a request for an activity type from a requestor, the request specifying a target disclosure audience,
determining the target disclosure audience is within an access limit for the activity,
allowing the activity type request,
determining a received data entity of the activity type,
determining the data entity passes a location-based filter configured for the activity type, and
enabling the requestor to access the data entity.

6. The user device of claim 5, wherein the location-based filter is configured to filter received data entities based on a location of the user device.

7. The user device of claim 5, wherein said determining the target disclosure audience is within an access limit for the activity comprises:
checking a default access limit.

8. The user device of claim 5, wherein said determining the target disclosure audience is within an access limit for the activity comprises:
checking an access limit configured by a user for the activity type.

9. The user device of claim 5, wherein the method further comprises:
in response to the activity type request being allowed, monitoring for activities that generate data entities that fall under the activity type.

10. The user device of claim 5, wherein the method further comprises:
determining a received second data entity of the activity type;
determining the second data entity fails to pass the location-based filter configured for the activity type; and
preventing access by the requestor to the second data entity.

11. The user device of claim 5, further comprising:
in response to the activity type request being allowed, registering the activity monitor to listen to specific data entities according to at least the location-based filter.

12. The user device of claim 5, further comprising:
receiving a second request for a second activity type from a second requestor, the second request specifying a second target disclosure audience;
determining the second target disclosure audience falls outside of an access limit for the second activity type; and
rejecting the second activity type.

13. The user device of claim 5, further comprising:
receiving a second request for a second activity type from a second requestor, the second request specifying a second target disclosure audience; and
determining that the second target disclosure audience falls outside of an access limit for the second activity type; and
enabling access by the second requestor to data entities that fall within the access limit for the second activity type but not to data entities that fall outside of the access limit for the second activity type.

14. A method in a user device, comprising:
analyzing activity records corresponding to received data entities for correlation;
inferring a privacy profile and an associated location-related situation based on said analyzing;
proposing the privacy profile to a user with an indication of the associated situation;
enabling the user to approve, reject, or modify at the proposed privacy profile and associated situation; and
including the proposed privacy profile and associated situation in a set of privacy profiles for the user when the user approves the proposed privacy profile.

15. The method of claim 14, wherein said analyzing activity records corresponding to received data entities for correlation comprises:
correlating first and second activity records based on location.

16. The method of claim 14, wherein the inferred location-related situation includes a location related to at least one of:
a vacation;
a work place;
a home;
exercise;
shopping;
dining; or
the movies.

17. The method of claim 14, wherein the inferred privacy profile is a work privacy profile, a vacation privacy profile, a home privacy profile, an exercise privacy profile, or a shopping privacy profile.

18. The method of claim 14, wherein said inferring comprises:
based on said analyzing, inferring an access limit for an activity type;
configuring the access limit with a filter that filters received data entities of the activity type based on location; and
including the access limit with the filter in the privacy profile.

19. The method of claim 14, further comprising:
collecting further activity records corresponding to further received data entities;
analyzing the collected further activity records;
inferring a situation trigger based at least on a location determined by said analyzing of the collected further activity records;
selecting an alternative privacy profile having an associated situation indicated by the inferred situation trigger from the set of privacy profiles; and
enacting the selected alternative privacy profile for the user.

20. The method of claim 19, further comprising:
collecting additional activity records according to the enacted privacy profile.

* * * * *